US008988751B2

(12) United States Patent
Motoyama et al.

(10) Patent No.: US 8,988,751 B2
(45) Date of Patent: Mar. 24, 2015

(54) OPTICAL SCANNING DEVICE AND IMAGE FORMING APPARATUS INCLUDING THE SAME

(75) Inventors: Takaharu Motoyama, Osaka (JP); Nobuhiro Shirai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 304 days.

(21) Appl. No.: 12/958,536

(22) Filed: Dec. 2, 2010

(65) Prior Publication Data

US 2011/0134501 A1    Jun. 9, 2011

(30) Foreign Application Priority Data

Dec. 4, 2009 (JP) ................... 2009-276562

(51) Int. Cl.
| G02B 26/08 | (2006.01) |
| G02B 26/10 | (2006.01) |
| G02B 26/12 | (2006.01) |
| G03G 15/32 | (2006.01) |
| G03G 15/04 | (2006.01) |
| H04N 1/113 | (2006.01) |
| H04N 1/12 | (2006.01) |
| G03G 15/043 | (2006.01) |

(52) U.S. Cl.
CPC ............ G03G 15/326 (2013.01); G02B 26/127 (2013.01); G03G 15/0409 (2013.01); H04N 1/1135 (2013.01); H04N 1/12 (2013.01); H04N 2201/0082 (2013.01); G03G 15/0435 (2013.01)
USPC ..................... 359/216.1; 359/212.1

(58) Field of Classification Search
USPC ................. 359/200–226.1; 250/205
See application file for complete search history.

(56) References Cited

U.S. PATENT DOCUMENTS

| 5,151,586 | A  |   | 9/1992  | Sato et al. |
| 5,315,427 | A  |   | 5/1994  | Rauch et al. |
| 5,570,224 | A  | * | 10/1996 | Endo et al. ................. 359/209.1 |
| 6,229,656 | B1 | * | 5/2001  | Omura .......................... 359/796 |
| 6,999,218 | B2 |   | 2/2006  | Kashimura |
| 7,471,434 | B2 | * | 12/2008 | Nakamura et al. ......... 359/203.1 |
| 7,855,818 | B2 |   | 12/2010 | Nakamura |
| 2004/0057098 | A1 | * | 3/2004 | Kashimura .................... 359/216 |
| 2005/0213177 | A1 | * | 9/2005 | Abe .............................. 359/206 |

(Continued)

FOREIGN PATENT DOCUMENTS

| JP | 4-106516 A | 4/1992 |
| JP | 6-214184 A | 8/1994 |

(Continued)

Primary Examiner — Thomas K Pham
Assistant Examiner — Sharrief Broome
(74) Attorney, Agent, or Firm — Birch, Stewart, Kolasch & Birch, LLP

(57) ABSTRACT

An optical scanning device is disclosed. The optical scanning device comprises an overfilled optical system in which an incoming light beam, formed wider than a width in a rotation direction of a rotating multifaceted mirror's reflective surface, is caused to be incident on the reflective surface and a scanning object's scanning surface is scanned by an outgoing beam reflected by the reflective surface. The incoming beam is incident on the rotating multifaceted mirror's reflective surface, having an angle with respect to a virtual vertical surface that is vertical to the scanning surface and the outgoing beam's scanning direction. A light amount distribution for positions on the scanning surface in the scanning direction is corrected based on a slope of a straight line that expresses a ratio of light amount changes for positions on the scanning surface in the scanning direction when scanning the scanning surface using the outgoing beam.

9 Claims, 19 Drawing Sheets

(56) References Cited

U.S. PATENT DOCUMENTS

| | | | |
|---|---|---|---|
| 2007/0146849 A1* | 6/2007 | Miyatake et al. | 359/204 |
| 2008/0124125 A1 | 5/2008 | Hirano | |
| 2008/0170282 A1* | 7/2008 | Amada et al. | 359/196 |
| 2008/0218829 A1 | 9/2008 | Nakamura | |
| 2009/0251755 A1* | 10/2009 | Oda | 359/216.1 |

FOREIGN PATENT DOCUMENTS

| | | | | |
|---|---|---|---|---|
| JP | 9-197316 A | 7/1997 | | |
| JP | 2000-71510 A | 3/2000 | | |
| JP | 2002-292934 A | 10/2002 | | |
| JP | 2003-287694 A | 10/2003 | | |
| JP | 2003287694 A | * 10/2003 | ............. | G02B 26/10 |
| JP | 2003-322816 A | 11/2003 | | |
| JP | 2004-109610 A | 4/2004 | | |
| JP | 2004-272126 A | 9/2004 | | |
| JP | 2005-70069 A | 3/2005 | | |
| JP | 2008-126644 A | 6/2008 | | |
| JP | 2008-216911 A | 9/2008 | | |

* cited by examiner

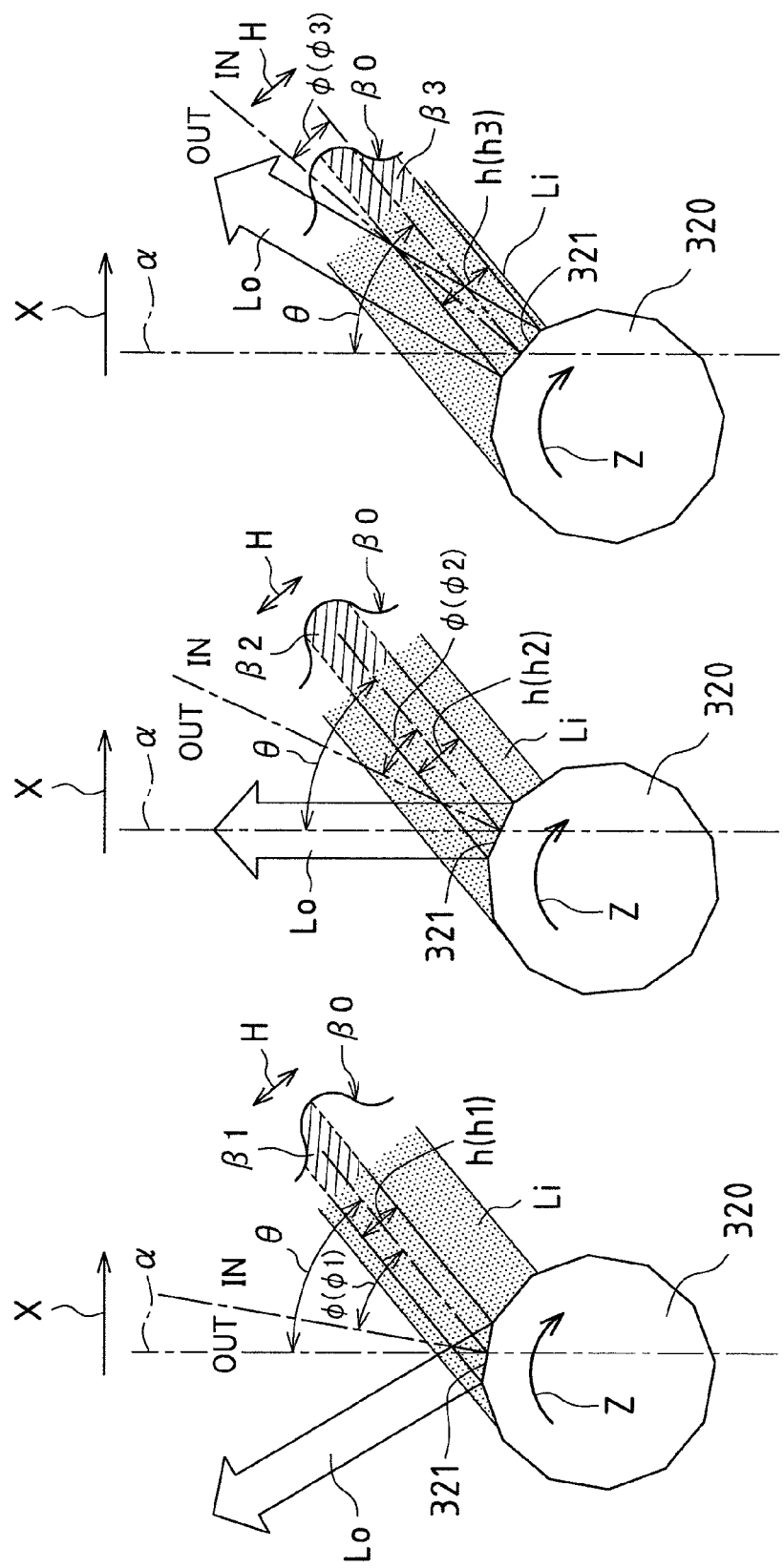

FIG.9
power control
(a) image data 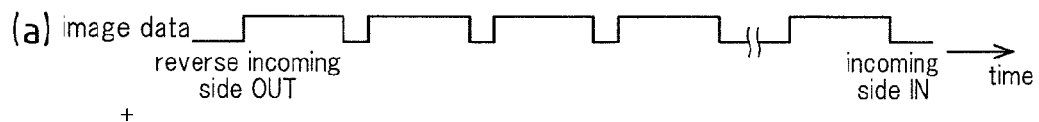
(b) PWM 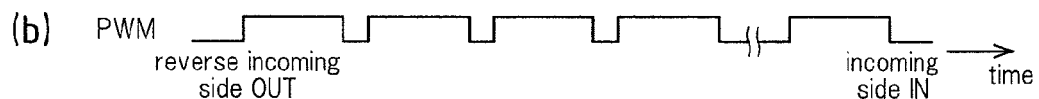
(c) Vref 
(d) 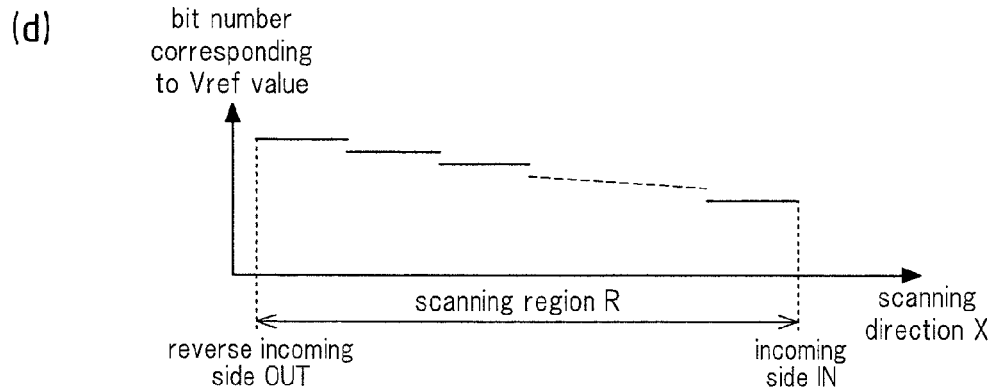
(e) 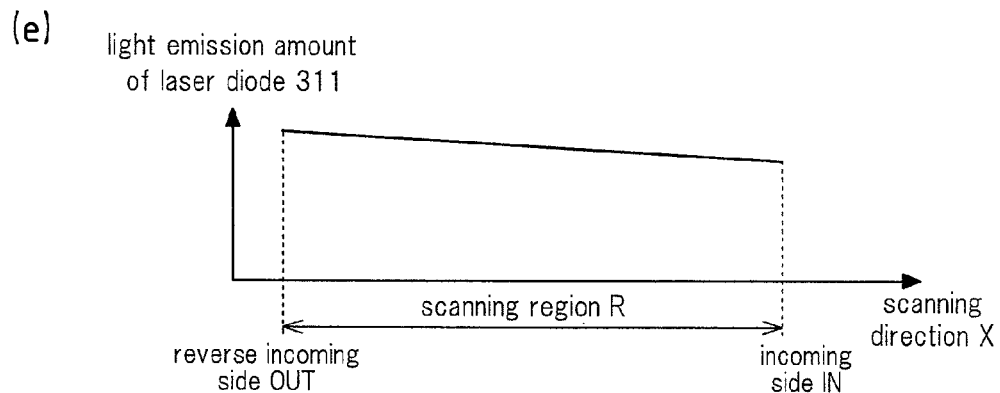

FIG.10
(a) 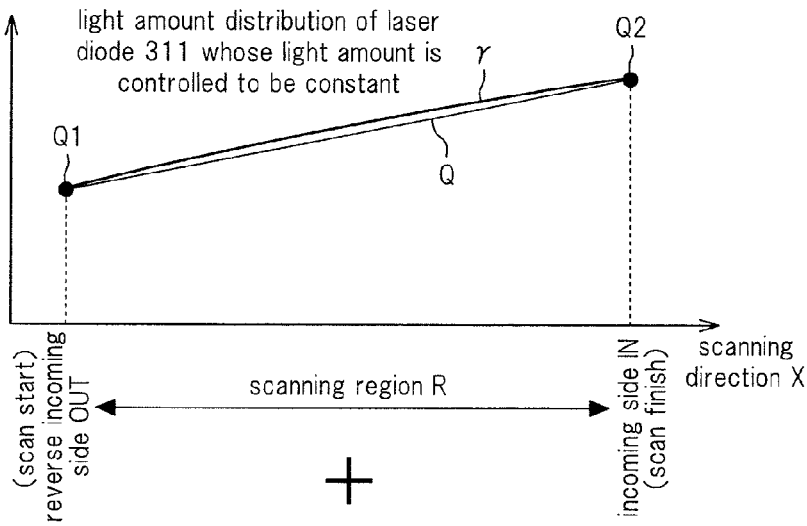
(b) 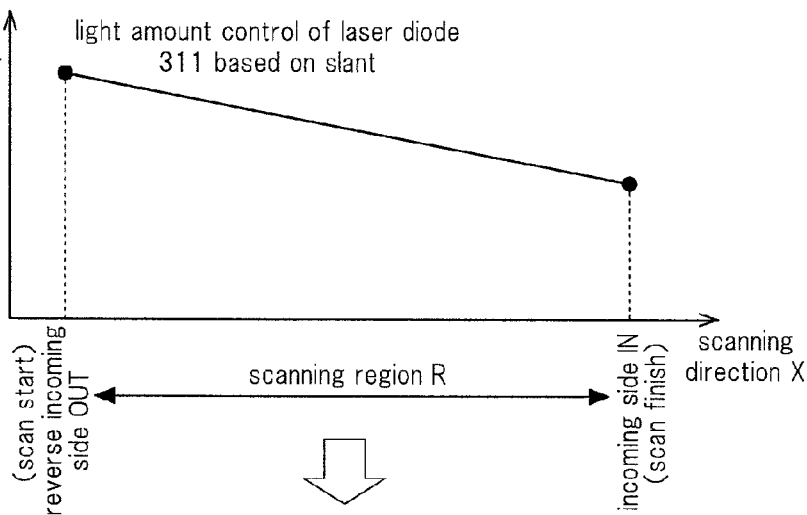
(c) 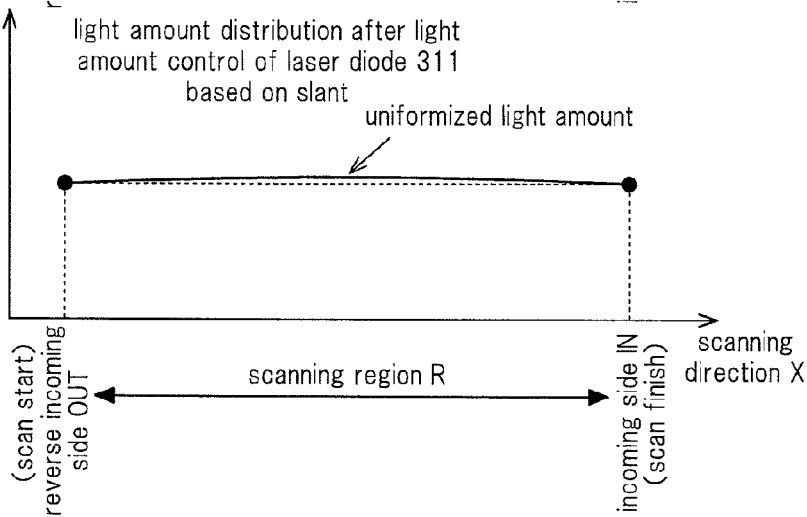

FIG.15
(a) 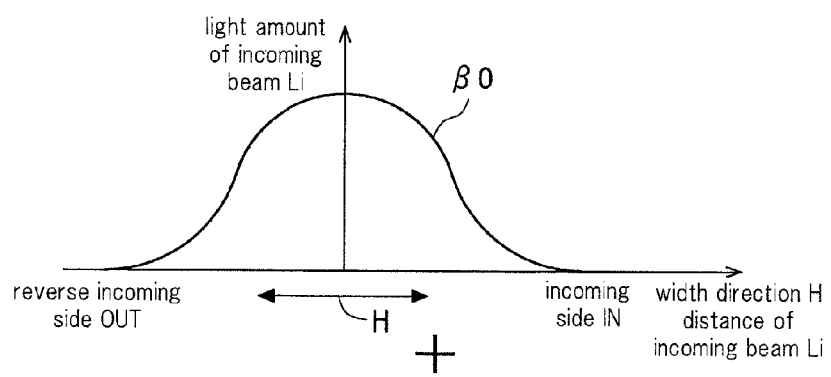
(b) 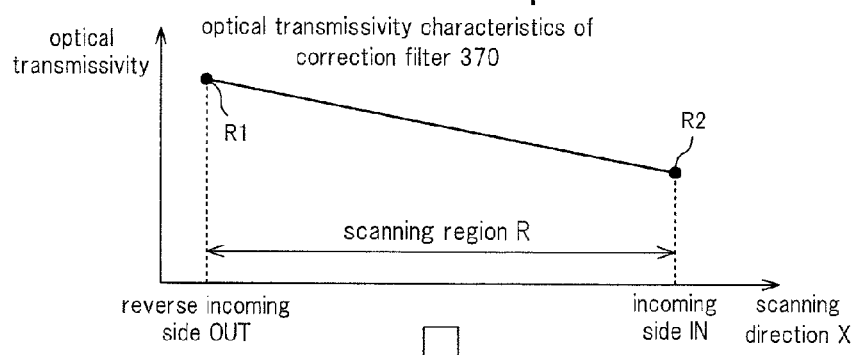
(c) 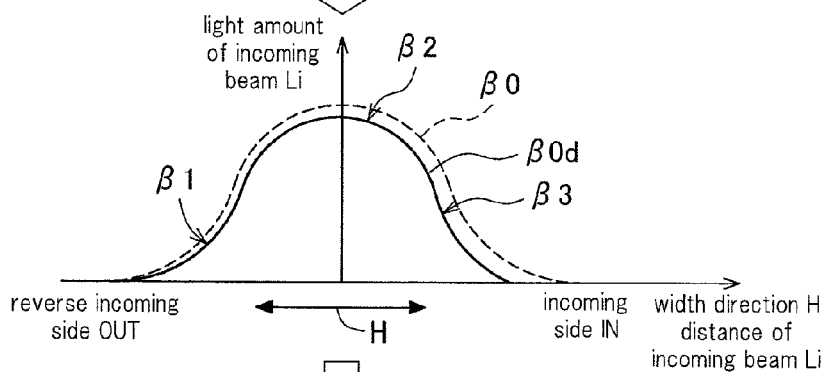
(d) 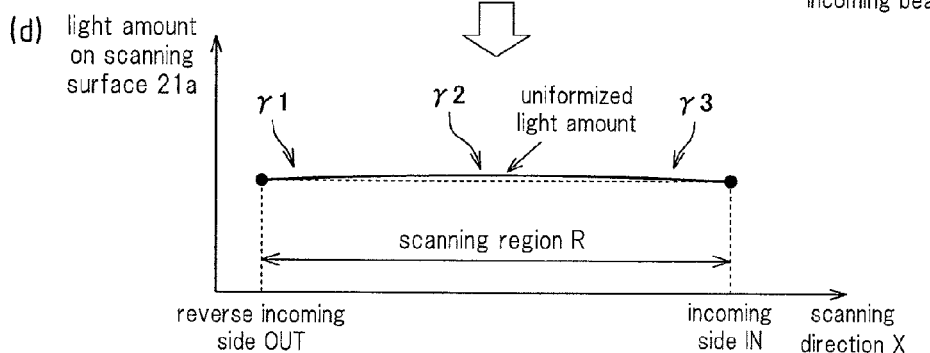

OPTICAL SCANNING DEVICE AND IMAGE FORMING APPARATUS INCLUDING THE SAME

CROSS-REFERENCE TO RELATED APPLICATIONS

This application claims priority under 35 U.S.C. §119(a) on Patent Application No. 2009-276562 filed in Japan on Dec. 4, 2009, the entire contents of which are herein incorporated by reference.

BACKGROUND OF THE INVENTION

The present invention relates to optical scanning devices that can be applied in image forming apparatuses such digital copiers, printers, and fax machines, and to image forming apparatuses.

Conventionally this type of optical scanning device has been installed in image forming apparatuses such as digital copiers, printers, and fax machines, and has been widely used as an optical writing means in these image forming apparatuses.

In these image forming apparatuses provided with optical scanning devices, in a case where image forming is to be performed using an electrophotographic image forming process for example, a surface of an image carrier (a photosensitive body or the like for example) acting as a scanning object is charged, then on the charged area is formed (written) an electrostatic latent image by irradiating an optical beam from a light source in the optical scanning device onto a rotating multifaceted mirror (also referred to as a polygonal mirror) while modulating the optical beam based on image information so as to scan the surface of the photosensitive body in a scanning direction.

The optical scanning device irradiates the optical beam from the light source toward the rotating multifaceted mirror having a plurality of reflective surfaces that are arranged along a rotation direction around the rotational axis, then an incoming beam that is incident from the light source onto the reflective surfaces of the rotating multifaceted mirror is reflected (becomes outgoing) by the reflective surfaces of the rotating multifaceted mirror, and a scanning surface on the scanning object is scanned by the outgoing beams reflected by the reflective surfaces of the rotating multifaceted mirror.

Broadly divided, two types of optical systems are known in optical scanning devices, one being an underfilled optical system in which the optical beam from the light source is irradiated onto only a portion of the reflective surfaces of the rotating multifaceted mirror, and the other being an overfilled optical system, in which the optical beam from the light source is formed wider than a width of the reflective surfaces of the rotating multifaceted mirror in the rotation direction to be irradiated onto the reflective surfaces of the rotating multifaceted mirror.

Of these, a configuration is common in optical scanning devices provided with the overfilled optical system in which, due to the nature of the optical beam from the light source being formed wider than the width of the reflective surfaces of the rotating multifaceted mirror in the rotation direction to be irradiated onto the reflective surfaces of the rotating multifaceted mirror, the incoming beam is incident on the reflective surfaces of the rotating multifaceted mirror in a state parallel to a virtual vertical surface that is vertical to the scanning surface, and vertical to the scanning direction of the outgoing beams.

The following problems exist in conventional optical scanning devices comprising an overfilled optical system.

FIG. 17 is an schematic view showing a conventional optical scanning device comprising an overfilled optical system.

The optical scanning device shown in FIG. 17 is provided with a light source 311d, a collimator lens 312d, a concave lens 313d, an aperture plate 314d, a cylindrical lens 315d, a folding mirror 316d, a rotating multifaceted mirror 320d, an f-theta lens 331d, a cylindrical lens 332d, and a scanning object 21 such as an image carrier.

In the optical scanning device shown in FIG. 17, an optical beam L from the light source 311d is reflected by the folding mirror 316d to form an incoming beam Li that is wider than the width of a reflective surface 320a of the rotating multifaceted mirror 320d in the rotation direction (a clockwise direction Z in the example of FIG. 17), and the thus-formed incoming beam Li is incident on the reflective surface 320a of the rotating multifaceted mirror 320d and a scanning surface 21a of the scanning object 21 is scanned by an outgoing beam Lo reflected by the reflective surface 320a. At this time, the incoming beam Li is incident on the reflective surface 320a of the rotating multifaceted mirror 320d in a state parallel to a virtual vertical surface α that is vertical to the scanning surface 21a and vertical to a scanning direction X of the outgoing beam Lo.

FIG. 18 is a graph showing a light amount (light intensity) distribution β0 with respect to a width direction H distance (a distance from a center C of the incoming beam Li) of the incoming beam Li that is incident from the light source 311d onto the reflective surface 320a of the rotating multifaceted mirror 320d.

As shown in FIG. 18, the incoming beam Li, which is incident from the light source 311d onto the reflective surface 320a of the rotating multifaceted mirror 320d, has a strongest light intensity at the center C of the width direction H, and indicates a normal distribution (Gaussian distribution) that progressively diminishes toward both outer sides from the center C of the width direction H.

When the incoming beam Li shown in FIG. 18 is incident on the reflective surface 320a of the rotating multifaceted mirror 320d in an optical scanning device comprising an overfilled optical system as shown in FIG. 17, the light amount becomes undesirably uneven, regardless of the necessity for the light amount to be even at every scanning position of the scanning surface 21a in the scanning direction X, when the scanning surface 21a is scanned by the outgoing beam Lo that is outgoing from the reflective surface 320a.

FIGS. 19(a) to 19(c) are descriptive diagrams for describing how the light amount becomes uneven in a scanning region R in the scanning direction X of the scanning surface 21a in the optical scanning device shown in FIG. 17, and show both the incoming state of the incoming beam Li and the outgoing state of the outgoing beam Lo with respect to the rotating multifaceted mirror 320d, together with the light amount distribution β0 with respect to the width direction H distance of the incoming beam Li. FIG. 19(a) shows a state in which the outgoing beam Lo is outgoing from the reflective surface 320a of the rotating multifaceted mirror 320d to an upstream side of the scanning direction X with reference to the virtual vertical surface α. FIG. 19(b) shows a state in which the outgoing beam Lo is outgoing from the reflective surface 320a of the rotating multifaceted mirror 320d and parallel to the virtual vertical surface α. FIG. 19(c) shows a state in which the outgoing beam Lo is outgoing from the reflective surface 320a of the rotating multifaceted mirror 320d to a downstream side of the scanning direction X with reference to the virtual vertical surface α.

Here, in regions β1, β2, and β3 corresponding to the outgoing beam Lo of the incoming beam Li, the light intensity of the outgoing beam Lo becomes greater toward the center of the incoming beam Li. Furthermore, the light intensity of the outgoing beam Lo is greater for larger beam widths h (incoming beam surface area) corresponding to the outgoing beam Lo of the incoming beam Li. Further still, a reflectance of the incoming beam Li by the reflective surface 320a, which is a ratio of the outgoing beam Lo to the incoming beam Li, is larger for smaller incidence angles φ of the incoming beam Li to the reflective surface 320a.

From these characteristics, when the outgoing beam Lo is outgoing from the reflective surface 320a of the rotating multifaceted mirror 320d to the upstream side (left side in the diagram) of the scanning direction X with reference to the virtual vertical surface α as shown in FIG. 19(a), the light intensity becomes stronger closer to the virtual vertical surface α in the region β1 corresponding to the outgoing beam Lo of the incoming beam Li. Moreover, in this state, an incidence angle φ1 becomes smaller as the outgoing beam Lo becomes closer to the virtual vertical surface α. Furthermore, a beam width h1 (incoming beam surface area) corresponding to the outgoing beam Lo of the incoming beam Li which is incident on the reflective surface 320a for the scanning object becomes larger as the outgoing beam Lo becomes closer to the virtual vertical surface α.

In contrast to this, when the outgoing beam Lo is outgoing from the reflective surface 320a of the rotating multifaceted mirror 320d parallel to the virtual vertical surface α as shown in FIG. 19(b), the light intensity is strongest in a region β2 corresponding to the outgoing beam Lo of the incoming beam Li, and moreover a beam width h2 (incoming beam surface area) corresponding to the outgoing beam Lo of the incoming beam Li is larger compared to the state shown in FIG. 19(a).

On the other hand, when the outgoing beam Lo is outgoing from the reflective surface 320a of the rotating multifaceted mirror 320d to the other side (right side in the diagram) of the scanning direction X with reference to the virtual vertical surface α as shown in FIG. 19(c), the light intensity becomes weaker farther from the virtual vertical surface α in a region β3 corresponding to the outgoing beam Lo of the incoming beam Li. Moreover, in this state, an incidence angle φ3 becomes larger as the outgoing beam Lo becomes farther from the virtual vertical surface α. Furthermore, a beam width h3 (incoming beam surface area) corresponding to the outgoing beam Lo of the incoming beam Li which is incident on the reflective surface 320a for the scanning object becomes smaller as the outgoing beam Lo becomes farther from the virtual vertical surface α.

FIG. 20 is a graph showing a light amount (light intensity) distribution γd with respect to a scanning direction X distance on the scanning surface 21a of the scanning object 21 (distance from a scanning position R0 where the outgoing beam Lo becomes parallel to the virtual vertical surface α) in the optical scanning device shown in FIG. 17.

As shown in FIG. 20, in the scanning region R of the outgoing beam Lo on the scanning surface 21a, in the state shown in FIG. 19(a), the light amount (light intensity) exhibits a tendency to increase progressively as the outgoing beam Lo becomes closer to the scanning position R0 where the outgoing beam Lo becomes parallel to the virtual vertical surface α as shown by a reference symbol γ1 in FIG. 20. Furthermore, in the state shown in FIG. 19(b), in the scanning region R of the outgoing beam Lo on the scanning surface 21a, the light amount (light intensity) is strongest at the scanning position R0 as shown by the reference symbol γ2 in FIG. 20. Furthermore, in the state shown in FIG. 19(c), in the scanning region R of the outgoing beam Lo on the scanning surface 21a, the light amount (light intensity) exhibits a tendency to decrease progressively farther from the scanning position R0 as shown by the reference symbol γ3 in FIG. 20.

That is, the light amount distribution γd on the scanning surface 21a in the scanning direction X is mountain shaped.

These facts can be summarized as shown in Table 1 below.

TABLE 1

| | scanning direction X | | |
|---|---|---|---|
| power of incoming beam | small since edge of incident distribution used | largest since center of incident distribution used | small since edge of incident distribution used |
| width of incoming beam | medium (h1) | large (h2) | medium (h3) |
| incidence angle φ | medium (medium reflectance) | none (large reflectance) | medium (medium reflectance) |
| power of outgoing beam | medium | large | medium |

It should be noted that these facts are the same for a case where the rotating multifaceted mirror 320d rotates in a reverse direction (counterclockwise direction in the examples of the drawings).

In relation to this, JP 2003-322816A discloses an example in an overfilled scanning optical system in which a filter is used as a diffractive optical element through which light from the light source is transmitted, with the filter exhibiting an optical transmissivity distribution of a substantially opposite shape to the mountain shaped light amount distribution in the scanning direction on the image surface (scanning surface).

In this overfilled scanning optical system, since the filter is used exhibiting an optical transmissivity distribution of the opposite shape (curved shape) to the mountain shaped light amount distribution in the scanning direction on the image surface (scanning surface), the filter has to be designed and manufactured to achieve a curved shaped optical transmissivity distribution aligned with slight changes in the light amount distribution, which correspondingly reduces leeway in the filter design and complicates the manufacturing of the filter, and thus there is a problem that the design and manufacture of the optical system is complicated. Generally, it is common for these filters to involve using a deposition method to form a light-shielding material as a film onto an optically transmissive member such as a glass plate, and in this case it is insufficient to improve the light amount distribution of the mountain shape, and unfortunately time and effort are required to manufacture a filter that exhibits the optical transmissivity distribution of the curved shape.

For example, when forming a film on the optically transmissive member, even though measures are attempted such as depositing the light-shielding material onto the optically transmissive member in the curved shape, in this case the manufacture of the filter will require excessive time and effort.

To address this issue, it is common for example to employ a filter that exhibits an optical transmissivity distribution in which the optical transmissivity is distributed partially different in the scanning direction.

For example, JP 2003-287694A discloses an example in which, as a filter that transmits light from the light source in an overfilled optical system, a filter is used that exhibits an optical transmissivity distribution in which the optical transmissivity of a central area in the scanning direction is extremely lowered and the optical transmissivity of the edge portions is extremely raised.

This overfilled optical system aims to achieve light amount uniformity on the scanning surface by controlling the optical transmissivity partially using the filter that exhibits a distribution in which the optical transmissivity is partially different in the scanning direction, but this is merely maintaining a uniform light amount macroscopically, and when viewed microscopically, the light amounts vary greatly at scanning positions corresponding to borders between regions having a lower optical transmissivity and regions having a higher optical transmissivity, and therefore, for example, this incurs changes in the image density obtained by the image forming apparatus at scanning positions corresponding to these borders.

For example, in a case of using deposition to form a light-shielding material as a film onto an optically transmissive member such as a glass plate, even with attempts at improvement such as arranging a mask portion diagonally to mask the optically transmissive member from the light-shielding material when forming the film on the optically transmissive member, it is a fact that positions (inflection points) still remain where the light amount varies greatly.

Furthermore, JP H6-214184A discloses an example in which, in an overfilled raster scanning system, a binary diffractive optical lens system including two diffractive optical lens elements is used to re-profile the optical beam intensities from the light source and generate a profile having a uniform intensity.

In this overfilled raster scanning system, the diffractive optical lens elements have to be designed and manufactured to achieve a profile having a uniform intensity by re-profiling the optical beam intensities from the light source, which correspondingly reduces leeway in the design of the diffractive optical lens elements and complicates the manufacturing of the diffractive optical lens elements, and thus there is a problem that the design and manufacture of the optical system is complicated.

Furthermore, to achieve uniform light amounts at scanning positions in the scanning direction on the scanning surface, it is also conceivable to control the light emission amounts of the light source aligned with slight changes in the light amount distribution for scanning direction positions on the scanning surface when scanning the scanning surface using the outgoing beam, but the control configuration becomes correspondingly complicated when controlling the light emission amounts of the light source aligned with slight changes in the light amount distribution, and thus the design of the optical system becomes complicated.

SUMMARY OF THE INVENTION

Accordingly, an object of the present invention is to provide an overfill type optical scanning device, which is an optical scanning device comprising an overfilled optical system, that while being an optical system that can be designed and manufactured easily, is capable of making uniform the light amounts at scanning positions in the scanning direction of the scanning surface, as well as an image forming apparatus comprising this optical scanning device.

The inventors of the present invention accomplished the present invention in regard to an optical scanning device comprising an overfilled optical system in which an incoming beam of a light beam from a light source formed wider than a width in a rotation direction of a reflective surface of a rotating multifaceted mirror is caused to be incident on the reflective surface, and a scanning surface of a scanning object is scanned by an outgoing beam reflected (caused to be outgoing) by the reflective surface, giving attention to that when the incoming beam is caused to be incident on the reflective surface in a state having an angle with respect to a virtual vertical surface that is vertical to the scanning surface and vertical to a scanning direction of the outgoing beam, a light amount distribution for scanning direction positions on the scanning surface when scanning the scanning surface using the outgoing beam exhibits optical characteristics that can be substantially approximated by a straight line having a slope (one-sided gradient).

That is, the inventors of the present invention discovered that by using these optical characteristics, control of the light emission amount of the light source, or design and manufacture of an optical system involving the design or manufacture of a light amount correction filter provided on an optical path between the light source and the scanning object, can be simplified.

The present invention is based on this knowledge, and in order to address the aforementioned issues provides an optical scanning device comprising an overfilled optical system in which an incoming beam of a light beam from a light source formed wider than a width in a rotation direction of a reflective surface of a rotating multifaceted mirror is caused to be incident on the reflective surface, and a scanning surface of a scanning object is scanned by an outgoing beam reflected by the reflective surface, wherein the incoming beam is caused to be incident on the reflective surface in a state having an angle with respect to a virtual vertical surface that is vertical to the scanning surface and vertical to a scanning direction of the outgoing beam, and a light amount distribution for scanning direction positions on the scanning surface is corrected based on a slope of a straight line that expresses a ratio of change of light amounts for positions on the scanning surface in the scanning direction when scanning the scanning surface using the outgoing beam. Furthermore, the present invention also provides an image forming apparatus comprising an optical scanning device according to the present invention, particularly an image forming apparatus comprising an optical scanning device according to the present invention and a photosensitive body to be scanned by the outgoing beam from the optical scanning device.

With an optical scanning device according to the present invention and an image forming apparatus comprising this, the light amount distribution is corrected for scanning direction positions on the scanning surface based on the slope of the straight line, and therefore the light amounts can be uniformized at scanning positions on the scanning surface in the scanning direction. Moreover, the correction of the light amount distribution for scanning direction positions on the scanning surface are corrections based on the slope of the straight line, and therefore the optical system that can be designed and manufactured easily.

An embodiment of the present invention that can be illustrated as an example is that a light emission amount of the light source is controlled based on the slope of the straight line.

With this embodiment, the light emission amount of the light source is controlled based on the slope of the straight line, and therefore the light amounts can be uniformized at scanning positions on the scanning surface in the scanning direction. Moreover, since the light emission amount of the light source may be controlled based on the slope of the straight line without controlling the light emission amount of the light source aligned with slight changes in the light amount distribution as is conventionally the case, the control configuration can be simplified. For example, by merely setting the parameters of two points, these being a light emission amount of the light source corresponding to one scanning position in the scanning direction on the scanning surface and a light emission amount of the light source corresponding to another scanning position in the scanning direction on the scanning surface in response to the slope of the straight line, then control of the light emission amount of the light source can be easily achieved based on the slope of the straight line. In this way, it is possible to simplify the control configuration, and thus also possible to simplify the design of the optical system.

Accordingly, with this embodiment of controlling the light emission amount of the light source, even though the design of the optical system is simple, the light amounts can be uniformized at scanning positions on the scanning surface in the scanning direction.

With this embodiment, the slope of the straight line may be set in advance, and it is also possible to detect the slope of the straight line as required.

In a case of a configuration in which the slope of the straight line can be detected as required, an embodiment can be illustrated as an example that is provided with a scan start side light amount detection portion that detects a light amount of the outgoing beam at a scan start side of the scanning surface, and a scan finish side light amount detection portion that detects the light amount of the outgoing beam at a scan finish side of the scanning surface.

With this embodiment, the slope of the straight line can be obtained based on the light amount of the outgoing beam at the scan start side of the scanning surface detected by the scan start side light amount detection portion and the light amount of the outgoing beam at the scan finish side of the scanning surface detected by the scan finish side light amount detection portion. In this way, the slope of the straight line can be detected at any time.

In this regard, in a case where the rotating multifaceted mirror is caused to rotate from an incoming side of the incoming beam to an outgoing side of the outgoing beam of an opposite side to the incoming side, the light amount exhibits a tendency to decrease at scanning positions on the scanning surface in the scanning direction as scanning advances on the scanning surface when scanning the scanning surface using the outgoing beam.

Conversely, in a case where the rotating multifaceted mirror is caused to rotate from the outgoing side to the incoming side, the light amount exhibits a tendency to increase at scanning positions on the scanning surface in the scanning direction as scanning advances on the scanning surface when scanning the scanning surface using the outgoing beam.

Thus, in a case where the rotating multifaceted mirror is caused to rotate from the incoming side to the outgoing side, it is preferable that the light emission amount of the light source is increased as scanning of the scanning surface advances. By doing this, the light emission amount of the light source can be controlled appropriately in response to a light amount distribution having a tendency to decrease in the scanning direction on the scanning surface due to the rotation direction of the rotating multifaceted mirror.

Furthermore, in a case where the rotating multifaceted mirror is caused to rotate from the outgoing side to the incoming side, it is preferable that the light emission amount of the light source is decreased as scanning of the scanning surface advances. By doing this, the light emission amount of the light source can be controlled appropriately in response to a light amount distribution having a tendency to increase in the scanning direction on the scanning surface due to the rotation direction of the rotating multifaceted mirror.

For this embodiment of controlling the light emission amount of the light source, an embodiment can be illustrated as an example in which the light emission amount of the light source is changed progressively or incrementally.

With this embodiment, control of the light emission amount of the light source based on the slope of the straight line can be achieved using a simple control configuration.

As an example of control of the light emission amount of the light source based on the slope of the straight line, an embodiment can be illustrated in which this is carried out by changing a duty ratio of a pulse signal that drives the light source, according to pulse width modulation.

With this embodiment, since merely the duty ratio is changed in existing pulse width modulation control configurations, a control configuration can be easily achieved in which the light emission amount of the light source is changed incrementally, for example.

Furthermore, as an example of control of the light emission amount of the light source based on the slope of the straight line, an embodiment can be illustrated in which a light source drive portion is provided that drives the light source based on an input reference signal, and the input reference signal is changed using power modulation.

With this embodiment, since merely the input reference signal is changed in existing power modulation control configurations, a control configuration can be easily achieved in which the light emission amount of the light source is changed progressively, for example.

An embodiment of the present invention can be illustrated using an example in which a light amount correction filter that is formed to have an optical transmissivity distribution based on the slope of the straight line is provided on an optical path between the light source and the scanning object.

With this embodiment, the light amount correction filter is formed to have an optical transmissivity distribution based on the slope of the straight line, and therefore with this light amount correction filter, the light irradiated onto the scanning surface can be shielded so that the light amounts on scanning positions in the scanning direction on the scanning surface are uniformized. Moreover, since it is sufficient to form the light amount correction filter so as to have an optical transmissivity distribution based on the slope of the straight line without having to design and manufacture the filter so as to have a curved shaped optical transmissivity distribution aligned with slight changes in the light amount distribution as is conventionally the case, there is increased leeway in the filter design and manufacturing of the filter can be simplified. For example, by merely setting the parameters of two points, these being an optical transmissivity corresponding to one scanning position in the scanning direction of the light amount correction filter and an optical transmissivity corresponding to another scanning position in the scanning direction of the light amount correction filter in response to the slope of the straight line, then the forming of an optical transmissivity distribution can be easily achieved based on the slope of the straight line in the light amount correction filter. In this way, it is possible to simplify the design and manufacture of the light amount correction filter, and thus also possible to simplify the design and manufacture of the optical system.

Accordingly, with this embodiment in which the light amount correction filter is provided, even though the design and manufacture of the optical system is simple, the light amounts can be uniformized at scanning positions on the scanning surface in the scanning direction.

It should be noted that in this embodiment, the light amount correction filter may be provided on an optical path between the light source and the reflective surface, and may be provided on an optical path between the reflective surface and the scanning object.

In this regard, the light amount exhibits a tendency to decrease at scanning positions on the scanning surface in the scanning direction from the incoming side of the incoming beam to the outgoing side of the outgoing beam of a side opposite to the incoming side when scanning the scanning surface using the outgoing beam.

For this reason, it is preferable that the light amount correction filter is formed so that the optical transmissivity of the optical transmissivity distribution increases from the incoming side toward the outgoing side. By doing this, the light irradiated onto the scanning surface can be shielded appropriately in response to the light amount distribution on the scanning surface in the scanning direction.

In the embodiment in which the light amount correction filter is provided, an embodiment can be illustrated as an example in which the optical transmissivity distribution increases progressively or incrementally.

With this embodiment, the optical transmissivity distribution can be simply and easily achieved based on the slope of the straight line in the light amount correction filter.

The light amount correction filter may be a component in which a light-shielding material is formed as a film on an optically transmissive member using a deposition method.

With this embodiment, since the light amount correction filter is formed using a deposition method to have a filter optical transmissivity distribution based on the slope of the straight line, the time and effort required in manufacturing the light amount correction filter can be greatly reduced.

It is preferable that the straight line is a straight line in which two points are joined corresponding to light amounts at one end and another end in the scanning direction on the scanning surface on a plane that expresses a ratio of change of the light amounts for positions on the scanning surface in the scanning direction when scanning the scanning surface using the outgoing beam.

With this embodiment, by merely setting the light amounts of two points, correction of the light amount distribution for scanning direction positions on the scanning surface can be easily achieved. In this way, it is possible to simplify the design and manufacture of the light amount correction filter, and thus also possible to simplify the design and manufacture of the optical system.

BRIEF DESCRIPTION OF THE DRAWINGS

FIG. 3(a) is a top view thereof and FIG. 3(b) is a lateral view thereof.

FIG. 4(a) to FIG. 4(c) are descriptive diagrams for describing the light amount distribution in scanning regions of the scanning surface in the scanning direction in the laser scanning device shown in FIG. 2. FIG. 4(a) is a diagram that shows a state in which the outgoing beam is outgoing from the reflective surface of the rotating multifaceted mirror to an upstream side of the scanning direction with reference to a virtual vertical surface. FIG. 4(b) is a diagram that shows a state in which the outgoing beam is outgoing from the reflective surface of the rotating multifaceted mirror parallel to the virtual vertical surface. FIG. 4(c) is a diagram that shows a state in which the outgoing beam is outgoing from the reflective surface of the rotating multifaceted mirror to a downstream side of the scanning direction with reference to the virtual vertical surface.

FIG. 9 is a descriptive diagram for describing power control of light emission amounts of a laser diode. Panel (a) of FIG. 9 is a timing chart showing temporal change in the cycle of image data. Panel (b) of FIG. 9 is a timing chart showing temporal change in the state of the control pulse signals for which the duty ratio is kept constant. Panel (c) of FIG. 9 is a timing chart showing temporal change in an input reference voltage that is set based on the slope of the gradient straight line. Panel (d) of FIG. 9 is a graph showing bit data corresponding to a value of the input reference voltage that has have been set based on the slope of the gradient straight line. Panel (e) of FIG. 9 is a graph showing the light emission amounts of a laser diode that has undergone power modulation control according to the input reference voltage.

FIG. 10 is a descriptive diagram showing how the light amount at scanning positions in the scanning direction on the scanning surface can be uniformized by controlling the light amount of the laser diode using the writing control portion. Panel (a) of FIG. 10 is a graph showing the light amount distribution and the gradient straight line of the scanning surface in the scanning direction when the light emission amount of the laser diode is controlled to be constant. Panel (b) of FIG. 10 is a graph showing the distribution of the light emission amount of the laser diode when control is performed based on the slope of the gradient straight line. Panel (c) of FIG. 10 is a graph showing the light amount distribution on the scanning surface in the scanning direction when the light emission amount of the laser diode is controlled based on the slope of the gradient straight line.

FIG. 15 is a descriptive diagram showing how the light amount at scanning positions in the scanning direction on the scanning surface can be uniformized by arranging a second light amount correction filter on an optical path between the laser diode and the rotating multifaceted mirror. Panel (a) of FIG. 15 is a graph showing the light amount (light intensity) distribution for width direction distances of the incoming beam in a state in which the second light amount correction filter is not arranged. Panel (b) of FIG. 15 is a graph showing optical transmissivity characteristics of the second light amount correction filter. Panel (c) of FIG. 15 is a graph showing the light amount (light intensity) distribution for width direction distances of the incoming beam after it has passed through the second light amount correction filter when the second light amount correction filter is arranged. Panel (d) of FIG. 15 is a graph showing the light amount distribution in the scanning direction on the scanning surface when the second light amount correction filter is arranged.

FIG. 16(a) is a diagram that shows a state in which the outgoing beam is outgoing from the reflective surface of the rotating multifaceted mirror to an upstream side of the scanning direction with reference to a virtual vertical surface. FIG. 16(b) is a diagram that shows a state in which the outgoing beam is outgoing from the reflective surface of the rotating multifaceted mirror parallel to the virtual vertical surface. FIG. 16(c) is a diagram that shows a state in which the outgoing beam is outgoing from the reflective surface of the rotating multifaceted mirror to a downstream side of the scanning direction with reference to the virtual vertical surface.

FIG. 19(a) is a diagram that shows a state in which the outgoing beam is outgoing from the reflective surface of the rotating multifaceted mirror to an upstream side of the scanning direction with reference to a virtual vertical surface. FIG. 19(a) is a diagram that shows a state in which the outgoing beam is outgoing from the reflective surface of the rotating multifaceted mirror parallel to the virtual vertical surface. FIG. 19(c) is a diagram that shows a state in which the outgoing beam is outgoing from the reflective surface of the rotating multifaceted mirror to a downstream side of the scanning direction with reference to the virtual vertical surface.

MODES FOR CARRYING OUT THE INVENTION

Hereinafter, embodiments according to the present invention will be described with reference to the accompanying drawings. It should be noted that the following embodiments are specific examples of the present invention and are not of a nature that limits the scope of the present invention.

Figure 1:
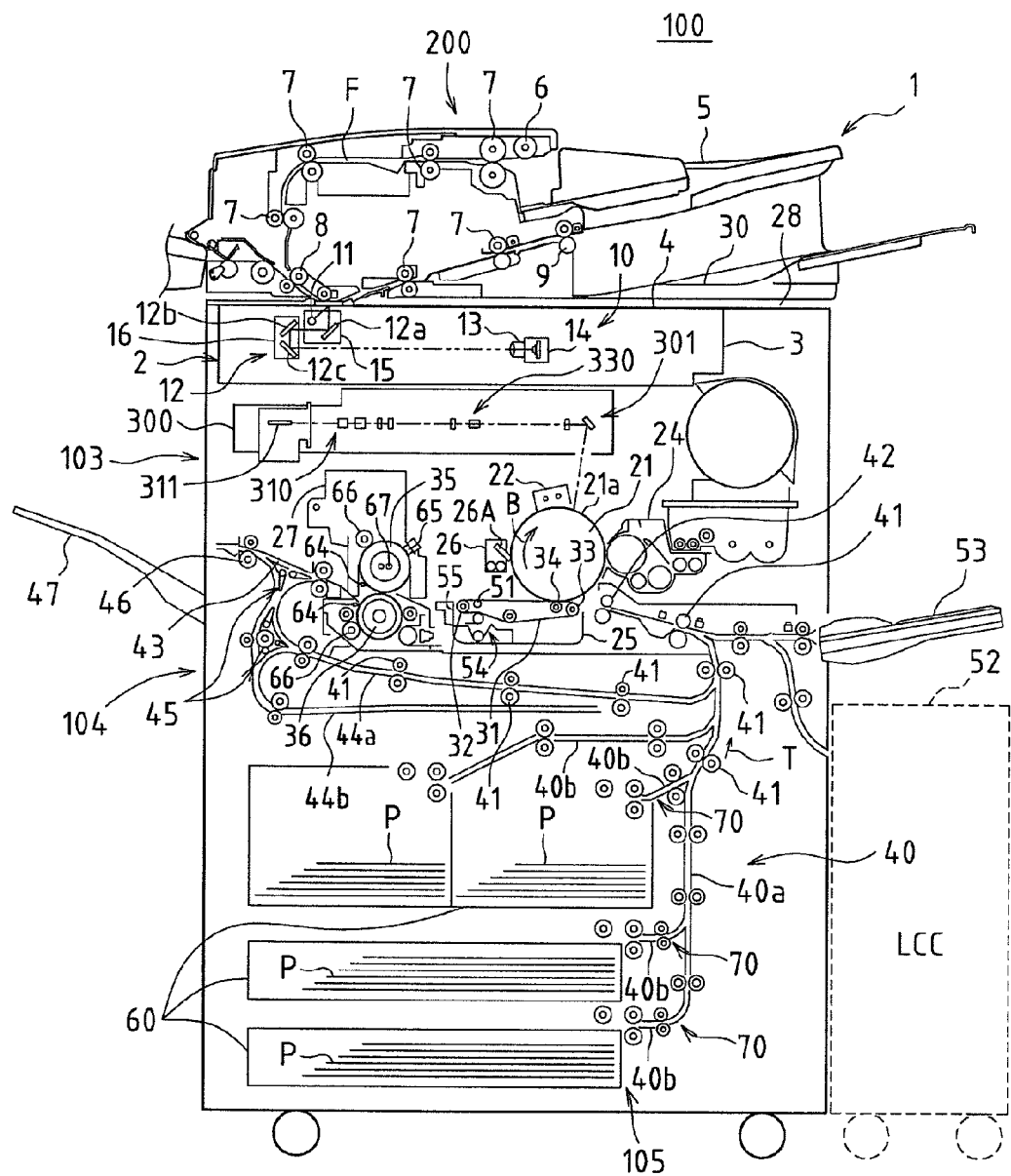
FIG. 1 is a cross-sectional view that schematically shows an image forming apparatus in which an embodiment of an optical scanning device comprising an overfilled optical system according to the present invention has been applied.

FIG. 1 is a cross-sectional view that schematically shows an image forming apparatus 100 in which an embodiment of an optical scanning device comprising an overfilled optical system according to the present invention has been applied.

First, description is given regarding an overall structure of the image forming apparatus 100 shown in FIG. 1. In the present embodiment, the image forming apparatus 100 shown in FIG. 1 forms images using an electrophotographic image forming process. The image forming apparatus 100 is provided with an image carrier (here, a photosensitive drum) 21, a charging apparatus (here, a charger) 22 for charging a scanning surface (surface) 21a of the photosensitive drum 21, an optical scanning device (here, a laser scanning device) 300 for forming an electrostatic latent image on the photosensitive drum 21, a development apparatus (here, a development unit) 24 for forming a toner image on the photosensitive drum 21 by developing the electrostatic latent image using a developer, a transfer apparatus (here, a transfer unit) 25 for transferring the toner image on the photosensitive drum 21 onto a recording sheet P such as plain paper, a fixing apparatus (here, a fixing unit) 27 for fixing the transferred image on the recording sheet P to the recording sheet P, a cleaning apparatus (here, a cleaning unit) 26 for removing residual toner that has not been transferred by the transfer unit 25 and remains on the surface of the photosensitive drum 21, and a control portion 50 (not shown in FIG. 1, see FIG. 6, which is described later) for performing overall control of the operations of the image forming apparatus 100.

Specifically, the image forming apparatus 100 is configured as an electrophotographic printer that forms a monochrome image (single color and black color image) on the recording sheet P in accordance with image data read from an original or image data received from an external device not shown in the diagram. The image forming apparatus 100 is provided with an original reading device 200, an image forming portion 103, a sheet transport path 40, a sheet reverse discharge path 104, and a feeding portion 105.

The original reading device 200 is provided with an automatic document feeder 1 that transports an original, which is not shown in the drawing, along an original transport path F, and an original reading portion 10 that reads an image of the original that has been transported in or an original that has been positioned.

The image reading portion 10 is configured so as to read the original that has been transported in by the automatic document feeder 1. Specifically, the image reading portion 10 is a reducing optical system reading means that is constituted by a light source 11, a group of mirrors (here, first to third mirrors 12a, 12b, and 12c), a lens 13 and an imaging device 14 such as a CCD (image sensor), and is accommodated in an original scanning portion 2.

The automatic document feeder 1 and the original scanning portion 2 are coupled by an unshown hinge at a rear surface side, and the automatic document feeder 1 is openable/closable with respect to the original scanning portion 2 through rotation of the hinge. And a lower surface of the automatic document feeder 1 is configured as a pressing panel 28 that presses from above onto an original to be read that is placed on a platen 4 of the original scanning portion 2.

The original scanning portion 2 is provided with a casing 3, the platen 4, which is constituted by a transparent glass plate, and the image reading portion 10, which is housed inside the casing 3.

The image reading portion 10 is provided with a light source unit 15, which holds the light source 11 and the first mirror 12a, a mirror unit 16, which holds the second mirror 12b and the third mirror 12c, the lens 13, and the imaging device 14.

The automatic document feeder 1 is provided with an original loading platform 5, a draw-in roller 6 that draws in sheet by sheet into the main unit the originals that have been placed on the original loading platform 5, a plurality of pairs of transport rollers 7 that transport drawn-in originals along the original transport path F, registration rollers 8 that regulate a paper-feed timing, and discharge rollers 9 that discharge originals for which image reading has been completed to a discharge tray 30.

In the automatic document feeder 1, the original that has been placed on the original loading platform 5 is transported by the original transport rollers 7 along the original transport path F toward the registration rollers 8, then temporarily stops upon reaching the registration rollers 8. Then, after the temporarily stopped original is transported to the image reading portion 10 by the registration rollers 8 rotating with the original transport rollers 7, an image of the original is read by the image reading portion 10 and the original is discharged to the discharge tray 30.

The original scanning portion 2 supports both image reading based on a stationary original method in which reading is carried out of an image of an original which has been placed on the platen 4 by a user, and a moving original method in which an image of an original is read while the original is automatically transported by the automatic document feeder 1.

In a case of reading an original image using the stationary original method, the light source unit 15, which is positioned in a home position corresponding to the stationary original method shown in FIG. 1, moves at a constant velocity while irradiating light onto the original to scan an image of the original, and at the same time as this, the mirror unit 16 moves with a movement velocity that is ½ the movement velocity of the light source unit 15.

After the reflected light from the original that was irradiated by light from the light source 11 of the light source unit 15 is reflected by the first mirror 12a arranged in the light source unit 15, it undergoes 180° optical path conversion by the second and third mirrors 12b and 12c of the mirror unit 16, and the light that is reflected from the third mirror 12c forms an image on the imaging device 14 via the lens 13, and here an image of the original is read and converted to electrical signals.

On the other hand, in a case of reading an original image using the moving original method, the light source unit 15 and the mirror unit 16 remain stationary at the home position and light is irradiated from the light source 11 onto the original, which is transported by the automatic document feeder 1 so as to pass over the home position, thereby scanning an image of the original, and after light reflected from the front surface side of the original is reflected by the first mirror 12a in a same manner as in the above-described stationary original method, the reflected light undergoes 180° optical path conversion by the second and third mirrors 12b and 12c of the mirror unit 16 and forms an image on the imaging device 14 via the lens 13, and here an image of the original is read and converted to electrical signals.

After the thus-converted electrical signals are converted to digital signals as image data, the digital signals are subjected to various types of image processing under the control of the control portion 50, which includes a microcomputer 56 or the like, then the digital signals are outputted to the image forming portion 103.

The image forming portion 103 is for recording an image on the recording sheet P based on the image data, and is provided with the aforementioned photosensitive drum 21, the charger 22, the laser scanning device 300, the development unit 24, the transfer unit 25, the cleaning unit 26, and the fixing unit 27.

The charger 22 is a charging means for uniformly charging the surface of the photosensitive drum 21 to a predetermined electric potential and in the present embodiment, is configured as a non-contact charger type device. It should be noted that the charger 22 may also be a roller type or brush type unit that makes contact with the photosensitive drum 21.

In the present embodiment, the laser scanning device 300 is configured as a laser scanning unit (LSU). Using a laser beam that is formed in response to the inputted image data, the laser scanning device 300 performs deflection scanning on the surface of the photosensitive drum 21, which has been uniformly charged by the charger 22 in a state rotated in a predetermined direction (arrow B direction in FIG. 1), thereby forming (writing) an electrostatic latent image corresponding to the inputted image data on the surface of the photosensitive drum 21. It should be noted that the laser scanning device 300 is described in detail later.

The development unit 24 supplies toner to the surface of the photosensitive drum 21 to develop (visualize) the electrostatic latent image formed on the photosensitive drum 21 and form a toner image (also referred to as a "visible image") on the surface of the photosensitive drum 21.

In the present embodiment, the transfer unit 25 is provided with a transfer belt 31, a drive roller 32, an idler roller 33, and an elastic conductive roller 34. The transfer belt 31 is suspended in a tensioned state between these rollers 32 to 34 and other rollers.

The transfer belt 31 moves due to rotation of these rollers, thereby transporting the recording sheet P that has been placed on the surface thereof. The transfer belt 31 has a predetermined resistance value (for example, $1\times10^9$ Ω/cm to $1\times10^{13}$ Ω/cm).

The elastic conductive roller 34 is pressed against the surface of the photosensitive drum 21 via the transfer belt 31. Due to this, the recording sheet P on the surface of the transfer belt 31 can be pressed against the surface of the photosensitive drum 21.

A transfer electric field having an opposite polarity to the charge of the toner image on the surface of the photosensitive drum 21 is applied to the elastic conductive roller 34. Due to this transfer electric field of the opposite polarity, the toner image on the surface of the photosensitive drum 21 can be transferred onto the recording sheet P on the transfer belt 31. For example, in a case where the toner image takes on a charge of a negative polarity, the polarity of the transfer electric field applied to the elastic conductive roller 34 is a positive polarity. Due to the elasticity of the elastic conductive roller 34 in the transfer unit 25, the photosensitive drum 21 and the transfer belt 31 do not make line contact, but rather make surface contact having a predetermined width (referred to as a transfer nip). Due to this, the transfer efficiency onto the transported recording sheet P can be improved.

A charge removal roller 51, which is for performing charge removal on the recording sheet P that has been charged by a voltage applied when it passes through a contact portion with the photosensitive drum 21 so that transport to subsequent processes is carried out smoothly, is arranged on a downstream side of the transfer region in the transport direction of the transfer belt 31. The charge removal roller 51 is arranged in contact with a rear surface of the transfer belt 31 (a surface on an opposite side from the surface where the recording sheet P is transported).

Furthermore, a belt cleaning unit 54, which removes toner on the transfer belt 31, and a charge removal arrangement 55, which carries out charge removal on the transfer belt 31, are arranged in the transfer unit 25. The charge removal arrangement 55 employs a technique of grounding the transfer belt 31 or employs a technique of actively applying to the transfer belt 31 an opposite polarity to the polarity of the transfer electric field.

The cleaning unit 26 has a cleaning blade 26A that removes and collects toner that is residual on the surface of the photosensitive drum 21 after development and transfer.

The fixing unit 27 applies heat and pressure to the recording sheet P to cause the toner image to thermally fix onto the recording sheet P. Specifically, the fixing unit 27 is provided with a hot roller 35 and a pressure roller 36. A recording sheet separation claw 64, a roller surface temperature detection member (for example, a thermistor) 65, and a roller surface cleaning member 66 are arranged on an outer circumferential surface of the hot roller 35. A heat source 67 is provided on an inner side of the hot roller 35 in order to heat the surface of the hot roller 35 to a predetermined temperature (a fixing temperature of approximately 160° C. to 200° C.). Furthermore, an unshown pressing member such as a load spring is arranged at both ends of the pressure roller 36 so that the pressure roller 36 is pressed into contact with the hot roller 35 with a predetermined load. The recording sheet separation claw 64 and the roller surface cleaning member 66 are arranged on an outer circumferential surface of the pressure roller 36 in a same manner as at the outer circumferential surface of the hot roller 35.

When the recording sheet P is transported to a pressing portion (referred to as a fixing nip portion) between the hot roller 35 and the pressure roller 36, due to the heat from the hot roller 35 and the pressing force of the hot roller 35 and the pressure roller 36, the unfixed toner image on the recording sheet P is subjected to thermal melting and pressure. Due to this, the toner image can be fixed onto the recording sheet P.

The sheet transport path 40 guides the recording sheet P from a plurality of paper feed trays 60 in the paper feed portion 105 onward to the image forming portion 103. Specifically, a plurality of pairs of transport rollers 41 and a pair of registration rollers 42 are provided on the sheet transport path 40 in order to transport the recording sheet P. The pair of registration rollers 42 transports the recording sheet P from the plurality of pairs of transport rollers 41 in synchronization with the electrostatic latent image on the photosensitive drum 21. The pair of registration rollers 42 is arranged on an upstream side from the photosensitive drum 21 in the sheet transport direction (T direction in FIG. 1) and on a downstream side from the plurality of pairs of transport rollers 41. Specifically, the pair of registration rollers 42 is arranged near the photosensitive drum 21 on the upstream side of the sheet transport direction T.

In the sheet transport path 40, the plurality of pairs of transport rollers 41 are configured to take in the recording sheet P from the paper feed trays 60 via a paper feeding arrangement 70, and transport the recording sheet P until a leading edge of the recording sheet P reaches the registration rollers 42. That is, the plurality of pairs of transport rollers 41 are configured to transport the recording sheet P such that the leading edge of the recording sheet P reaches and contacts the registration rollers 42, which are temporarily stopped, until the recording sheet P bends there. Due to an elastic force of the bent recording sheet P, the leading edge portion of the recording sheet P can be aligned parallel to the registration rollers 42. After this, due to the registration rollers 42 being rotationally driven, the recording sheet P is transported to the transfer unit 25 of the image forming portion 103.

The sheet reverse discharge path 104 is provided with a transport path 43 and reverse transport paths 44*a* and 44*b*. A plurality of branching claws 45 and a pair of discharge rollers 46 are provided in the sheet reverse discharge path 104.

The sheet reverse discharge path 104 is configured such that the recording sheet P, which has undergone image forming by the image forming portion 103, is transported by the discharge rollers 46 to the discharge tray 47 via the transport path 43. And in a case where image forming is to be performed also on the back surface of the recording sheet P, the sheet reverse discharge path 104 is configured such that by selectively switching the plurality of pairs branching claws 45 respectively, the recording sheet P is guided from the transport path 43 to the reverse transport path 44*b*, where transport of the recording sheet P is temporarily stopped. Further still, the sheet reverse discharge path 104 is configured such that by again selectively switching the branching claws 45, the recording sheet P is guided from the reverse transport path 44*b* into the reverse transport path 44*a*. In this way, the recording sheet P is reversed front to back and returned to the registration rollers 42 via the reverse transport path 44*a* and the sheet transport path 40 for an image to be formed also on the back surface.

The paper feed portion 105 is provided with the plurality of paper feed trays 60 and a plurality of paper feeding arrangements 70 arranged corresponding to these. Each of the paper feed trays 60 is a tray for storing a plurality of sheets of recording sheets P and are provided in a lower portion of the image forming apparatus 100.

Since an object of the image forming apparatus 100 is high speed image forming, each of the paper feed trays 60 ensures a capacity capable of storing from 500 to 1,500 sheets of standard size recording sheets P such as A4, A3, B4, and the like.

Furthermore, at a lateral surface of the image forming apparatus 100 are provided a large capacity paper feed cassette (LCC) 52, which is capable of storing large volumes of same type or different types of recording sheets P, and a manual feeding tray 53 mainly for supplying nonstandard sizes and/or small amounts of recording sheets P.

The discharge tray 47 is arranged at a lateral surface of an opposite side to the manual feeding tray 53. Instead of the discharge tray 47, the image forming apparatus 100 can be configured such that post processing devices for discharged recording sheets (for example, post processing devices for stapling, punching and the like) or a plurality of levels of discharge trays are arranged as options.

It should be noted that since the transport path for transporting the recording sheets P from the paper feed trays 60 to the image forming portion 103 is shared, the sheet transport path 40 has a single main transport path 40a and a plurality of sub transport paths 40b for transporting the recording sheets P from the plurality of paper feed trays 60 respectively to the main transport path 40a. That is, the main transport path 40a is configured such that the recording sheets P from the plurality of paper feed trays 60 are guided via their corresponding sub transport paths 40b.

In the image forming apparatus 100, the recording sheet P selected from among the plurality of paper feed trays 60 matching the print request is transported by the transport rollers 41 in the sheet transport path 40 up to the registration rollers 42, then temporarily stops upon reaching the registration rollers 42. Then, the temporarily stopped recording sheet P is transported to the transfer unit 25 by the registration rollers 42 rotating with the transport rollers 41 with a timing in synchronization with the toner image formed on the photosensitive drum 21, and after the toner image on the photosensitive drum 21 has been transferred onto the recording sheet P, the recording sheet P is guided to the fixing unit 27 where the transferred toner image is fixed onto the recording sheet P, then the recording sheet P is discharged to the discharge tray 47.

Laser Scanning Device

Figure 2:
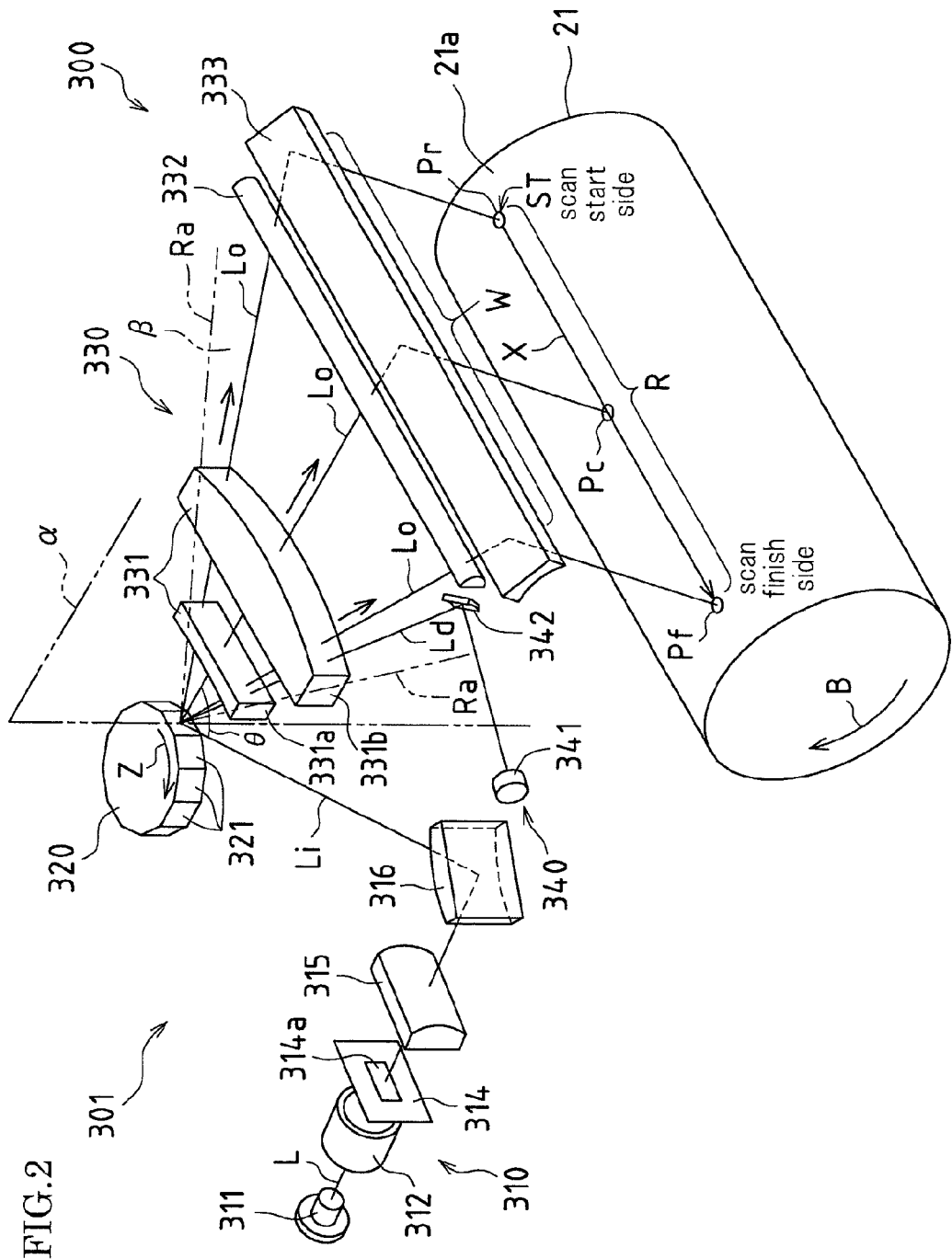
FIG. 2 is a perspective view schematically showing a configuration of a laser scanning device in the image forming apparatus shown in FIG. 1.

Next, description is given regarding the laser scanning device 300 according to an embodiment of the present invention with reference to FIG. 2.

FIG. 2 is a perspective view schematically showing a configuration of the laser scanning device 300 in the image forming apparatus 100 shown in FIG. 1.

The laser scanning device 300 shown in FIG. 2 is provided with an oblique incidence type overfilled optical system 301 in which a light beam (hereinafter referred to as laser beam) L from a semiconductor laser (here, a laser diode) 311 acting as a light source is reflected by the folding mirror 316d to form the incoming beam Li that is wider than the width of the reflective surface 321 of the rotating multifaceted mirror 320 in the rotation direction (clockwise direction of arrow Z in FIG. 2), and the thus-formed incoming beam Li is incident on the reflective surface 321 of the rotating multifaceted mirror 320, then the scanning surface (surface) 21a of the photosensitive drum 21 acting as the scanning object is scanned by the outgoing beam Lo that is reflected (becomes outgoing) by the reflective surface 321 of the rotating multifaceted mirror 320.

Here, the optical path from the laser diode 311 to the rotating multifaceted mirror 320 is referred to as the incoming optical path, and the optical path from the rotating multifaceted mirror 320 to the photosensitive drum 21 is referred to as the outgoing optical path. Furthermore, a collective term for the optical components arranged on the incoming optical path is incoming optical system 310, and a collective term for the optical components arranged on the outgoing optical path is outgoing optical system 330. The overfilled optical system 301 is constituted by the incoming optical system 310 and the outgoing optical system 330.

The laser diode 311 irradiates the laser beam L in response to image data under the direction of a writing control portion 400 (not shown in FIG. 1 and FIG. 2, see FIG. 6 described later). The laser diode 311 irradiates a conical divergent light flux, which is a diffused light whose diffusion angle in a direction corresponding to the main scanning direction (the direction in which deflection scanning of the outgoing beam Lo is performed by the rotating multifaceted mirror 320) is larger than a diffusion angle in a direction corresponding to the sub scanning direction (the direction in which photosensitive drum 21 rotates).

The incoming optical system 310 is formed so that the laser beam L irradiated from the laser diode 311 is guided to the rotating multifaceted mirror 320, and so that a cross section shape of the laser beam L is rectangular with a width wider than the width of the reflective surface 321 of the rotating multifaceted mirror 320 in the rotation direction Z.

A collimator lens 312, aperture 314, a first cylindrical lens 315, and an incoming folding mirror 316 are arranged in this order from an upstream side to a downstream side in the direction of light advancement on the incoming optical path in the incoming optical system 310.

The collimator lens 312 shapes the conical laser beam L, which is irradiated from the laser diode 311 in a diffused manner, into the parallel laser beam L. The aperture 314 is here configured as a plate member (aperture plate) in which an aperture 314a is formed in a substantially central area from a planar view having a elongated rectangular shape in a direction corresponding to the main scanning direction. The aperture plate (aperture) 314 shapes the laser beam L such that a vertical cross section normal to the optical axis of the laser beam L changes from a circular shape to a rectangular shape. The first cylindrical lens 315 and the incoming folding mirror 316 focus the laser beam L onto the reflective surface 321 of the rotating multifaceted mirror 320. In this manner, the incoming beam Li is incident on the rotating multifaceted mirror 320. It should be noted that incoming beam Li refers to the laser beam that is incoming toward the rotating multifaceted mirror 320.

Since the overfilled optical system 301 employs the overfill method, the optical components of the incoming optical system 310 are designed so that the surface area of the spot of the incoming beam Li that is focused on the rotating multifaceted mirror 320 is larger than the surface area of a single reflective surface 321 on the rotating multifaceted mirror 320.

And the incoming optical system 310 is configured so that the incoming beam Li is caused to be incident (hereinafter referred to as "obliquely incident") on the reflective surface 321 of the rotating multifaceted mirror 320 in a state having an angle θ with respect to the virtual vertical surface α that is vertical to the scanning surface 21a of the scanning object 21, and vertical to the scanning direction (arrow X direction in FIG. 2) of the outgoing beam Lo. Here, the scanning direction X is a direction parallel to the rotational axis of the photosensitive drum 21.

Here, the virtual vertical surface α that is vertical to the scanning direction X of the outgoing beam Lo refers to a surface that is vertical to a virtual scanning plane β formed by the center of the outgoing beam Lo scanned by the rotating multifaceted mirror 320. It should be noted that in FIG. 2, the reference symbol Ra indicates a maximum scanning range, which is an overall range in the scanning direction in which the outgoing beam Lo is deflection-scanned by the rotating multifaceted mirror 320.

The rotating multifaceted mirror 320 is a rotating structure having multiple (here, twelve) reflective surfaces 321 arranged around a rotational axis in a rotation direction. The rotating multifaceted mirror 320 is rotationally driven by a rotational drive portion 322 (see FIG. 6) such as a drive motor that performs drive under instructional commands from the writing control portion 400. The rotating multifaceted mirror 320 performs deflection scanning of the incoming beam Li, which is reflected by the incoming folding mirror 316 onto the reflective surfaces 321, in the main scanning direction by being rotationally driven by the rotational drive portion 322 from an outgoing side (hereinafter referred to as reverse incoming side) OUT of the outgoing beam Lo of an opposite side to an incoming side IN of the incoming beam Li toward the incoming side IN (here, in the rotation direction Z). In this manner, the outgoing beam Lo is outgoing from the rotating multifaceted mirror 320. It should be noted that the outgoing beam Lo refers to the laser beam that is reflected by the reflective surfaces 321 of the rotating multifaceted mirror 320.

The outgoing optical system 330 is configured so that the outgoing beams Lo reflected by the reflective surfaces 321 of the rotating multifaceted mirror 320 are guided from rotating multifaceted mirror 320 to the photosensitive drum 21, and so that beam spots Pr, Pc, and Pf are a predetermined size when the outgoing beam Lo is irradiated onto the photosensitive drum 21 to scan the photosensitive drum 21 at a uniform velocity.

An f-theta lens 331 constituted by a pair of lens 331a and 331b, a second cylindrical lens 332, and an outgoing folding mirror 333 are arranged in this order from an upstream side to a downstream side in the direction of light advancement on the outgoing optical path in the outgoing optical system 330.

The f-theta lens 331 (331a and 331b) corrects image deformation that originates in a disparity between the optical path length of the outgoing beam Lo that passes through main scanning direction end portions of the f-theta lens 331 and the optical path length of the outgoing beam Lo that passes through the main scanning direction central area of the f-theta lens 331 due to the deflection scanning of the rotating multifaceted mirror 320. Through a reciprocal action with the first cylindrical lens 315, the second cylindrical lens 332 corrects optical face tangle error of the rotating multifaceted mirror 320. The outgoing folding mirror 333 is formed by executing aluminum deposition onto a glass plate. The outgoing folding mirror 333 reflects the outgoing beam Lo that has passed through the second cylindrical lens 332 and guides this to the scanning surface 21a.

It should be noted that the second cylindrical lens 332 and the outgoing folding mirror 333 are provided independently in the present embodiment, but instead of the second cylindrical lens 332 and the outgoing folding mirror 333, it is also possible to provide a cylindrical mirror having functions of both the second cylindrical lens 332 and the outgoing folding mirror 333.

Incidentally, although the outgoing beam Lo scans the scanning surface 21a periodically in the scanning direction X, the photosensitive drum 21 rotates in the arrow B direction, and therefore it is also possible to scan the photosensitive drum 21 in the sub scanning direction.

In the laser scanning device 300, it is necessary to synchronize a scan start position ST at each line so the scan start position ST on each line is the same each time the outgoing beam Lo scans the photosensitive drum 21 in the scanning direction X.

As a signal for achieving this synchronization, the outgoing beam Lo is detected at an outer side of an effective scanning range W for writing the electrostatic latent image on the scanning surface 21a using the outgoing beam Lo (hereinafter the outgoing beam Lo referred to here is referred to as a synchronization detection beam Ld).

In the present embodiment, the laser scanning device 300 is further provided with a beam detecting portion 340 that detects the outgoing beam Lo at a scan finish side of the scanning surface 21a.

The beam detecting portion 340 includes a beam detecting (BD) sensor 341 that detects a presence/absence of the synchronization detection beam Ld, and a synchronization folding mirror 342 positioned at an outer side of the scanning range W (here, the scan finish side) that guides the synchronization detection beam Ld to the BD sensor 341. The synchronization folding mirror 342 has a concave reflective surface.

With the beam detecting portion 340 provided with this configuration, the synchronization detection beam Ld, which is the outgoing beam Lo that has passed through the f-theta lens 331 by being deflection-scanned by the rotating multifaceted mirror 320 to move to the outer side of the scanning range W (here, the scan finish side), is folded by the synchronization folding mirror 342 and the presence/absence of the synchronization detection beam Ld is detected by the BD sensor 341.

Figure 18:
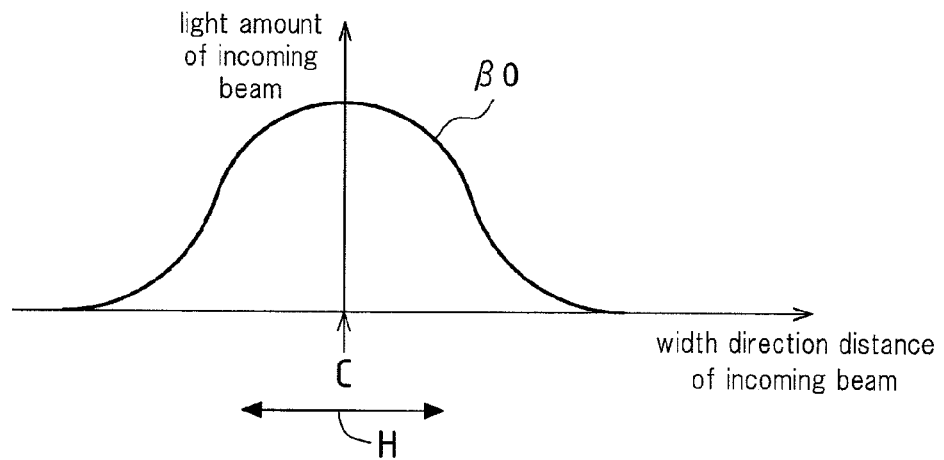
FIG. 18 is a graph showing a light amount (light intensity) distribution with respect to a width direction distance of the incoming beam that is incident from the light source onto the reflective surface of the rotating multifaceted mirror.

Next, along with FIG. 2, description is given with reference to FIG. 3(a) to FIG. 5 regarding light amount states at scanning positions as shown in FIG. 18 on the scanning direction X of the scanning surface 21a when the incoming beam Li is incident on the reflective surface 321 of the rotating multifaceted mirror 320 so that the scanning surface 21a is scanned by the outgoing beam Lo that is made outgoing by the reflective surface 321.

Figure 3A:
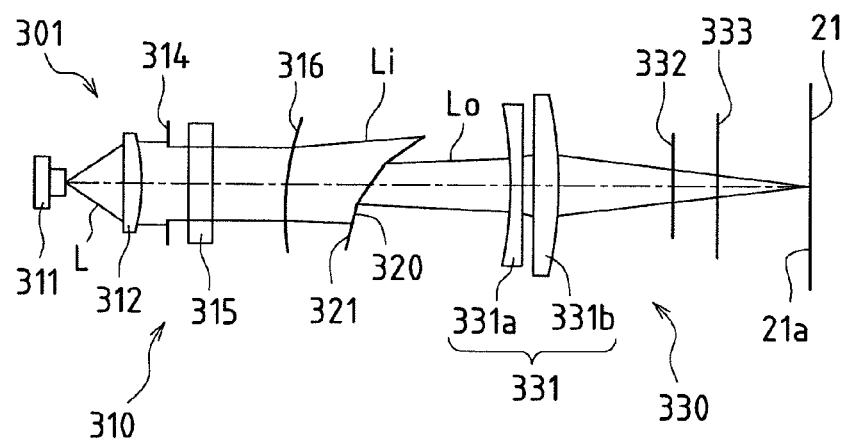
FIG. 3(a) and FIG. 3(b) are schematic views showing states of the optical axis of the optical beam in the laser scanning device shown in FIG. 2 expressed as straight lines.
Figure 3B:
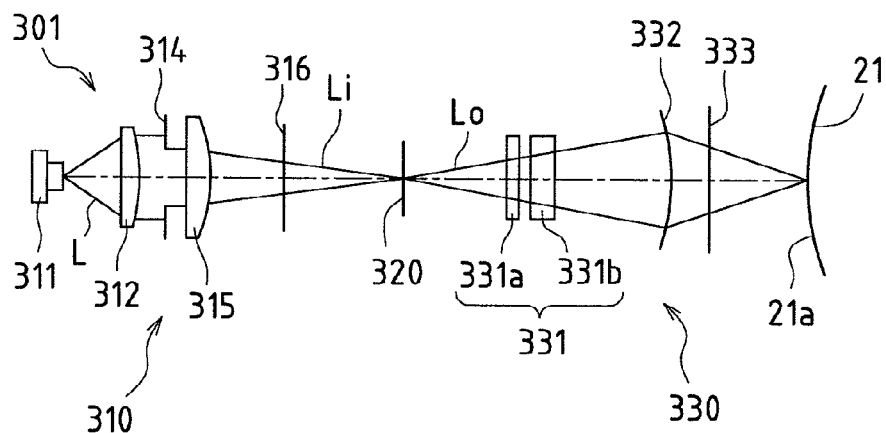

FIG. 3(a) and FIG. 3(b) are schematic views showing states of the optical axis of the optical beam in the laser scanning device 300 shown in FIG. 2 expressed as straight lines. FIG. 3(a) is a top view and FIG. 3(b) is a lateral view.

In writing an electrostatic latent image on the scanning surface 21a, the laser scanning device 300 outputs a divergent light flux, which is diffused light from the laser diode 311 that has undergone modulation control in response to image data from the writing control portion 400.

As shown in FIG. 2 and FIGS. 3(a) and 3(b), the laser beam L that is diffused and outputted from the laser diode 311 is made substantially parallel in a direction corresponding to the sub scanning direction by the collimator lens 312, and is converted to a substantially parallel beam that is a divergent light that diverges slightly in a direction corresponding to the main scanning direction, then is guided to the aperture plate 314 and is irradiated in a region wider than a width in a direction corresponding to the main scanning direction of the aperture 314a of the aperture plate 314.

That is, to prevent stray light inside the device, the beam width of the laser beam L, which is made into a substantially parallel beam by the collimator lens 312, is restricted in directions corresponding to the main scanning direction and the sub scanning direction in the vicinity of the rotating multifaceted mirror 320 by the aperture 314a provided in a substantially central area of the aperture plate 314.

The laser beam L that passes through the aperture plate 314 and is incident on the first cylindrical lens 315 is caused by the first cylindrical lens 315 to converge on the reflective surfaces 321 of the rotating multifaceted mirror 320 or the vicinity thereof in only a direction corresponding to the sub scanning direction, and is formed into a laser beam having a elongated linear shape in a direction corresponding to the main scanning direction. Next, the incoming beam Li, which has passed through the first cylindrical lens 315 and has been reflected by the incoming folding mirror 316, is guided to the rotating multifaceted mirror 320.

Here, since the overfilled optical system 301 employs the overfill method, the incoming beam Li is irradiated on the reflective surface 321 for the scanning object of the rotating multifaceted mirror 320 so that its irradiation region includes all or a portion of the reflective surfaces 321 that neighbor on both sides the reflective surface 321 for the scanning object.

And the incoming beam Li is incident on the reflective surface 321 of the rotating multifaceted mirror 320 in a state having an angle θ with respect to the virtual vertical surface α.

Upon being reflected by the reflective surface 321 of the rotating multifaceted mirror 320, the outgoing beam Lo is directed toward the f-theta lens 331 while staying a substantially parallel beam in the direction parallel to the virtual scanning plane β, but becoming a diffused beam in the direction vertical to the virtual scanning plane β.

The outgoing beam Lo that has passed through the f-theta lens 331 becomes a converged beam so as to converge on the scanning surface 21a in the direction parallel to the virtual scanning plane β, while staying a diffused beam in the direction vertical to the virtual scanning plane β. After this, the outgoing beam Lo is directed toward the second cylindrical lens 332. The outgoing beam Lo that has passed through the second cylindrical lens 332 stays a converged beam in the direction parallel to the virtual scanning plane β, and changes to a converged beam in the direction vertical to the virtual scanning plane β so as to converge on the photosensitive drum 21, then is folded by the outgoing folding mirror 333 to reach the photosensitive drum 21.

As described above, the outgoing beams Lo produces the beam spots Pr, Pc, and Pf of a predetermined size on the photosensitive drum 21. Although not shown in FIG. 3(a) and FIG. 3(b), the synchronization detection beam Ld of the outgoing beams Lo is changed by the synchronization folding mirror 342 into a converged beam directed toward a light-receiving surface of the BD sensor 341. It should be noted that in addition to its aforementioned role, the f-theta lens 331 also fulfills a role of performing conversion so that the outgoing beams Lo, which move at a uniform angular velocity due to a uniform angular velocity movement of the rotating multifaceted mirror 320, move at a uniform linear velocity in the scanning direction X while forming the beam spots Pr, Pc, and Pf on the photosensitive drum 21.

Incidentally, in the laser scanning device 300 according to the present embodiment, since the incoming beam Li is caused to be "obliquely incident" in a state having an angle θ with respect to the virtual vertical surface α, when scanning the scanning surface 21a using the outgoing beam Lo, the light amount distribution γ at positions in the scanning direction X on the scanning surface 21a exhibit optical characteristics that can be substantially approximated by a straight line having a slope (one-sided gradient), hereinafter referred to as a gradient straight line Q.

Figure 17:
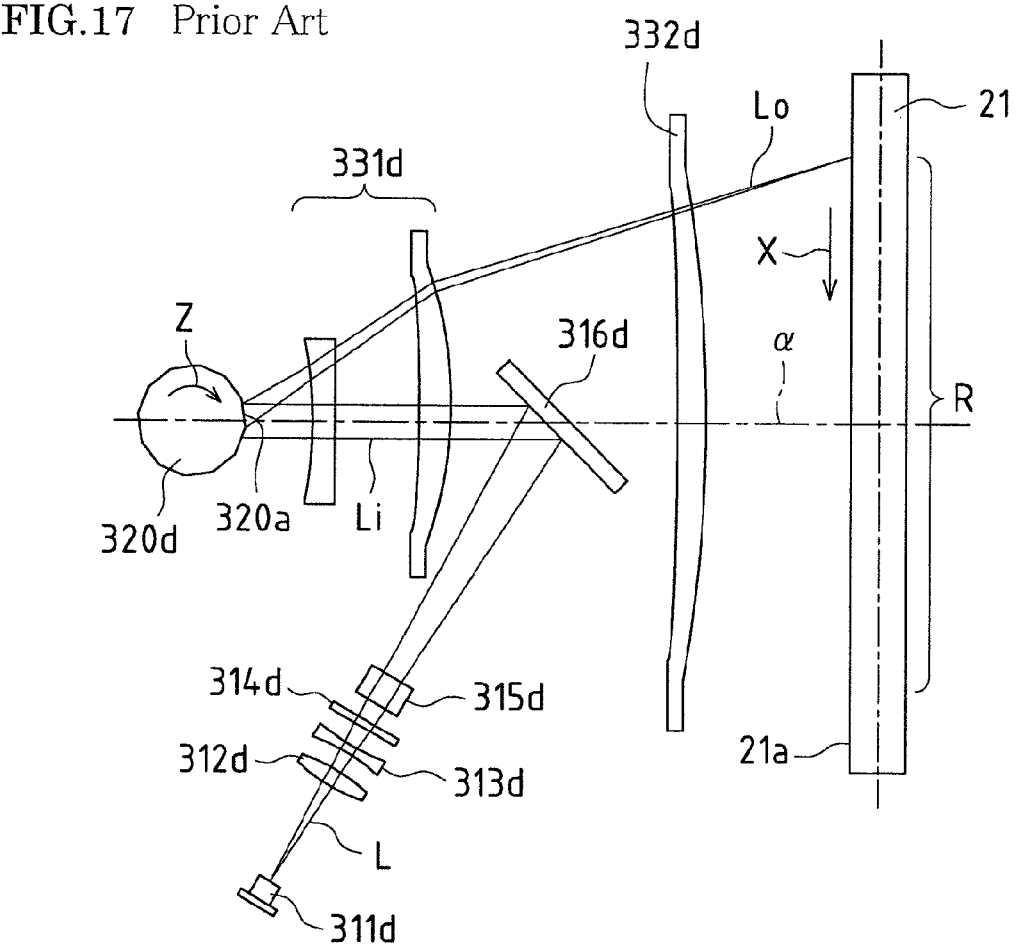
FIG. 17 is a schematic view showing a configuration of a conventional optical scanning device comprising an overfilled optical system.
Figure 20:
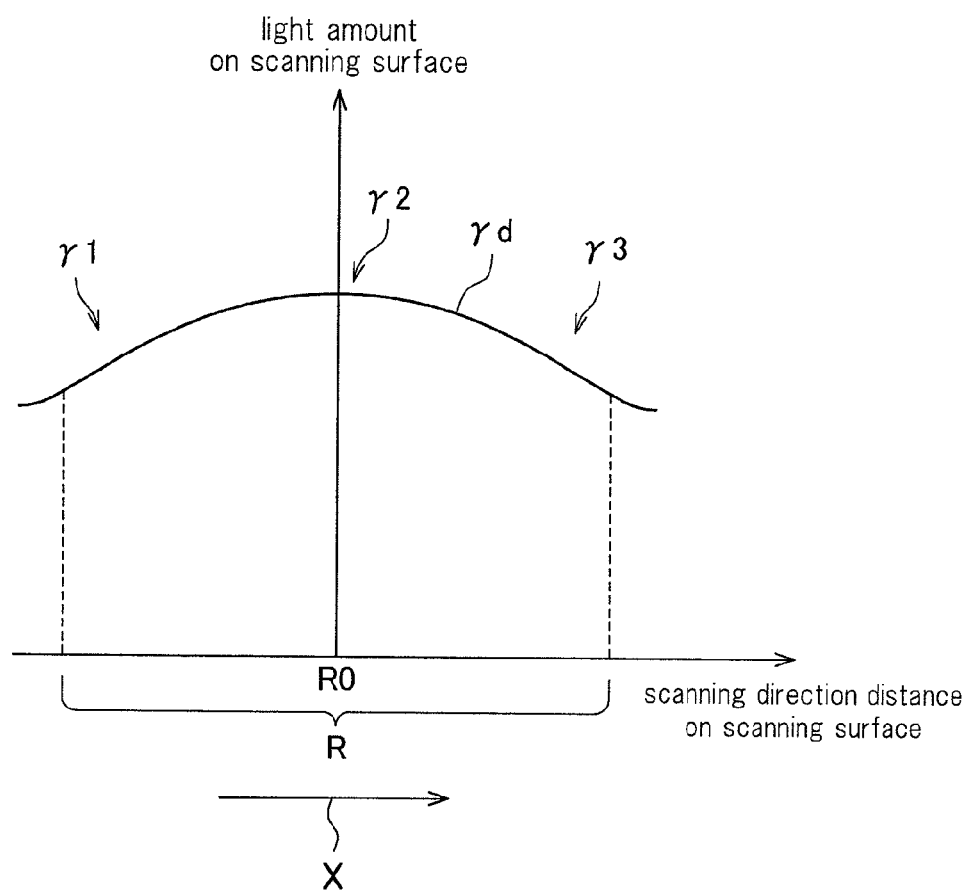
FIG. 20 is a graph showing a light amount (light intensity) distribution with respect to a scanning direction distance on the scanning surface of a scanning object in the optical scanning device shown in FIG. 17.

That is, in a convention optical scanning device, since the incoming beam Li is caused to be incident (hereinafter referred to as "parallel incidence") on the reflective surface 320a of the rotating multifaceted mirror 320d in a state parallel to the virtual vertical surface α as shown in FIG. 17, in the incoming optical system having a broad beam, the light amount (light intensity) distribution γd on the scanning surface 21a in the scanning direction X is mountain shaped, and as shown in FIG. 20, this has a tendency to drop remarkably particularly at end regions on the photosensitive drum 21 in the scanning direction X. One cause that can be set forth for this is that, as shown in FIG. 18, the incoming beam Li has intensities in a Gaussian distribution β0, and only a portion of those beams are used as reflected light.

FIGS. 4(a) to 4(c) are descriptive diagrams for describing the light amount distributions in the scanning region R in the scanning direction X on the scanning surface 21a in the laser scanning device 300 shown in FIG. 2, and show the light amount distribution β0 with respect to the width direction H distance of the incoming beam Li for both the incoming state of the incoming beam Li and the outgoing state of the outgoing beam Lo with respect to the rotating multifaceted mirror 320. FIG. 4(a) shows a state in which the outgoing beam Lo is outgoing from the reflective surface 321 of the rotating multifaceted mirror 320 to an upstream side of the scanning direction X with reference to the virtual vertical surface α. FIG. 4(b) shows a state in which the outgoing beam Lo is outgoing from the reflective surface 321 of the rotating multifaceted mirror 320 and parallel to the virtual vertical surface α. FIG. 4(c) shows a state in which the outgoing beam Lo is outgoing from the reflective surface 321 of the rotating multifaceted mirror 320 to a downstream side of the scanning direction X with reference to the virtual vertical surface α.

Figure 19A:
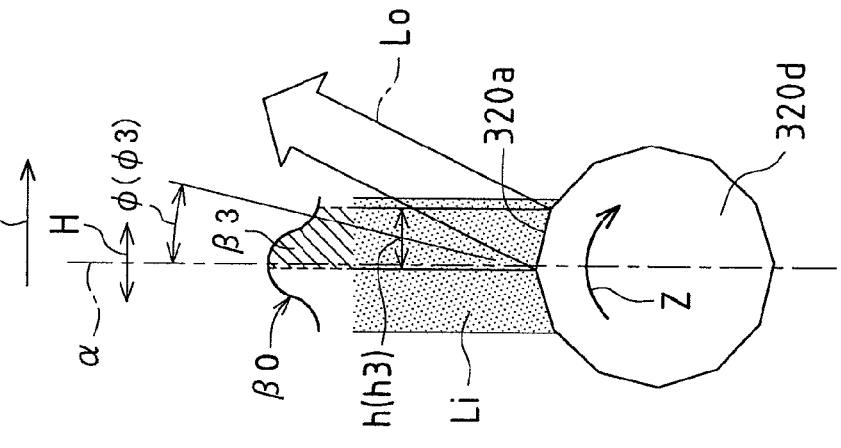
FIG. 19(a) to FIG. 19(c) are descriptive diagrams for describing how the light amounts become uneven in scanning regions of the scanning surface in the scanning direction in the optical scanning device shown in FIG. 17.

In the laser scanning device 300 according to the present embodiment, the incoming beam Li is caused to be incident on the reflective surface 321 of the rotating multifaceted mirror 320 in a state having an angle θ with respect to the virtual vertical surface a, and therefore when the outgoing beam Lo is outgoing from the reflective surface 321 of the rotating multifaceted mirror 320 to the upstream side (left side in the diagram) of the scanning direction X with reference to the virtual vertical surface α as shown in FIG. 4(a), the light intensity becomes stronger moving toward the incoming side IN in the region β1 corresponding to the outgoing beam Lo of the incoming beam Li. Moreover, in this state, the incidence angle φ1 becomes smaller as the outgoing beam Lo moves toward the incoming side IN. Furthermore, the beam width h1 (incoming beam surface area) corresponding to the outgoing beam Lo of the incoming beam Li which is incident on the reflective surface 321 for the scanning object becomes larger as the outgoing beam Lo moves toward the incoming side IN. It should be noted that in the state shown in FIG. 4(a), compared to the state shown in FIG. 19(a) in the case where the incoming beam Li has "parallel incidence," the incidence angle φ is larger and the beam width h is smaller.

Figure 19B:
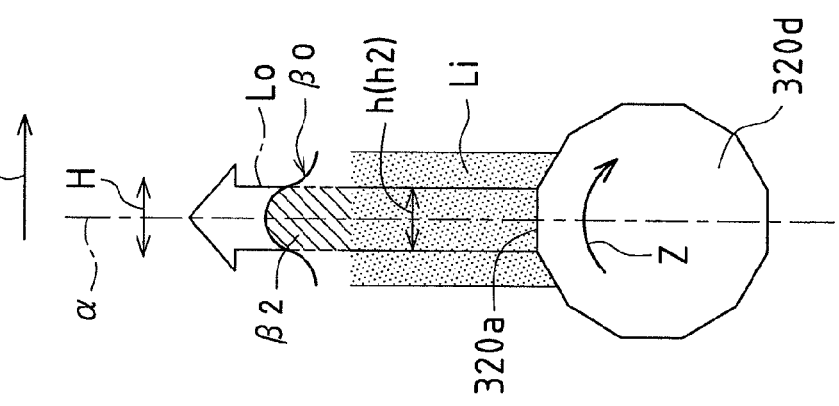

Furthermore, when the outgoing beam Lo is outgoing from the reflective surface 321 of the rotating multifaceted mirror 320 parallel to the virtual vertical surface α as shown in FIG. 4(b), the light intensity is strongest in the region β2 corresponding to the outgoing beam Lo of the incoming beam Li. And, in this state also, the incidence angle φ2 still becomes smaller as the outgoing beam Lo moves closer to the incoming side IN. Furthermore, the beam width h2 (incoming beam surface area) corresponding to the outgoing beam Lo of the incoming beam Li which is incident on the reflective surface 321 for the scanning object becomes larger as the outgoing beam Lo moves toward the incoming side IN. It should be noted that in the state shown in FIG. 4(b), compared to the state shown in FIG. 19(b) in the case where the incoming beam Li has "parallel incidence," the incidence angle φ is larger and the beam width h is smaller.

Figure 19C:
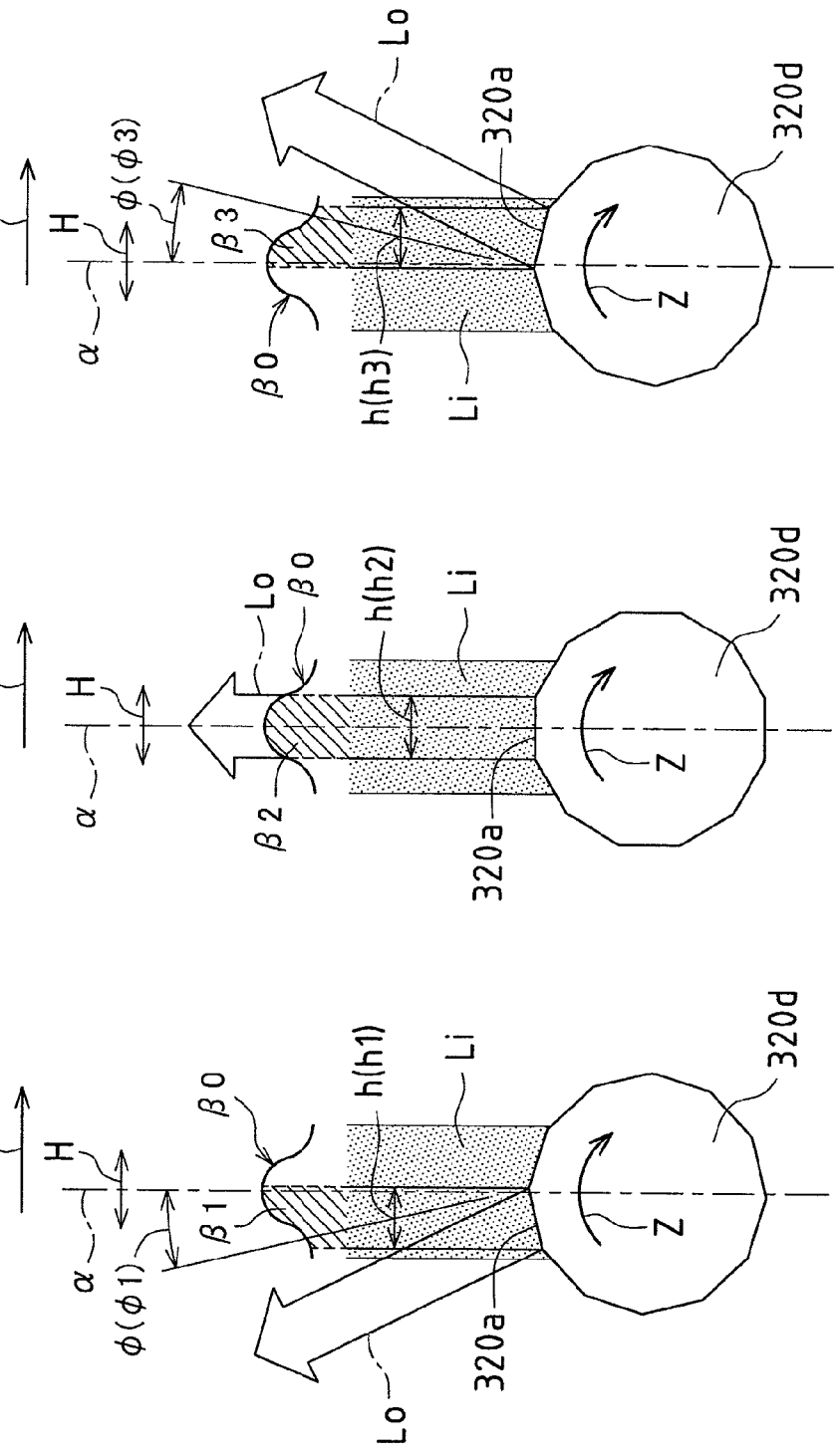

Furthermore, when the outgoing beam Lo is outgoing from the reflective surface 321 of the rotating multifaceted mirror 320 to the other side (right side in the diagram) of the scanning direction X with reference to the virtual vertical surface α as shown in FIG. 4(c), although the light intensity becomes weaker moving toward the incoming side IN in the region 63 corresponding to the outgoing beam Lo of the incoming beam Li, in this state also, the incidence angle φ3 still becomes smaller as the outgoing beam Lo moves toward the incoming side IN. Furthermore, the beam width h3 (incoming beam surface area) corresponding to the outgoing beam Lo of the incoming beam Li, which is incident on the reflective surface 321 for the scanning object, becomes larger as the outgoing beam Lo moves toward the incoming side IN. It should be noted that in the state shown in FIG. 4(c), compared to the state shown in FIG. 19(c) in the case where the incoming beam Li has "parallel incidence," the incidence angle φ is smaller and the beam width h is larger.

Figure 5:
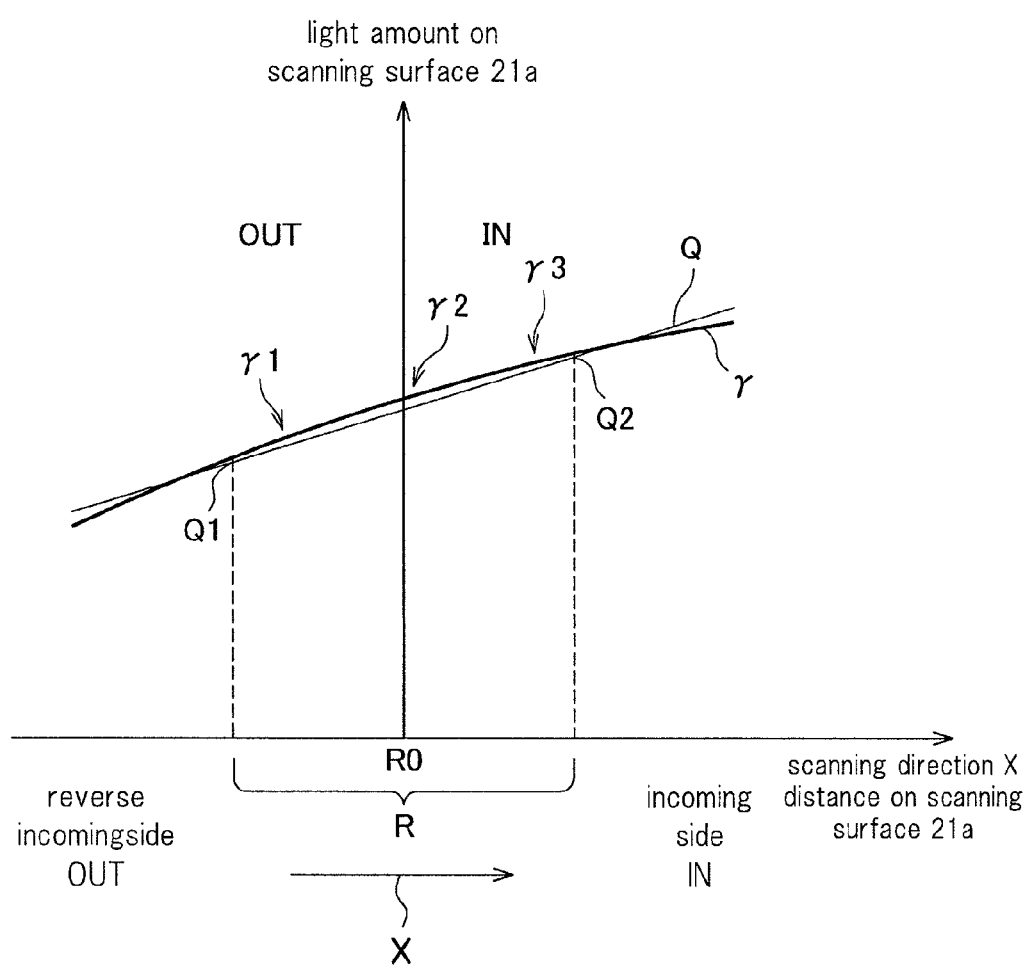
FIG. 5 is a graph showing a light amount distribution and a gradient straight line with respect to a scanning direction distance on the scanning surface in the laser scanning device shown in FIG. 2.

FIG. 5 is a graph showing a light amount distribution γ and a gradient straight line Q with respect to a scanning direction X distance on the scanning surface 21a in the laser scanning device 300 shown in FIG. 2.

As shown in FIG. 5, in the scanning region R of the outgoing beam Lo on the scanning surface 21a, in the state shown in FIG. 4(a), the light amount (light intensity) exhibits a tendency to increase as the outgoing beam Lo moves toward the incoming side IN as shown by the reference symbol γ1 in FIG. 5. Furthermore, in the state shown in FIG. 4(b), the light amount (light intensity) exhibits a tendency to increase as the outgoing beam Lo moves toward the incoming side IN as shown by the reference symbol γ2 in FIG. 5. Furthermore, in the state shown in FIG. 4(c), the light amount (light intensity) exhibits a tendency to increase as the outgoing beam Lo moves toward the incoming side IN as shown by the reference symbol γ3 in FIG. 5.

That is, the light amount distribution γd on the scanning surface 21a in the scanning direction X exhibits optical characteristics that can be substantially approximated by the gradient straight line Q.

These facts can be summarized as shown in Table 2 below.

TABLE 2

| | scanning direction X → | | |
|---|---|---|---|
| | small since edge of incident distribution used (equivalent to incoming side) | largest since center of incident distribution used | small since edge of incident distribution used (equivalent to reverse incoming side) |
| power of incoming beam | | | |
| width of incoming beam | small (h1) | medium (h2) | large (h3) |
| incidence angle φ | large (small reflectance) | medium (medium reflectance) | small (large reflectance) |
| power of outgoing beam | small | medium | large |

It should be noted that in a case where the incoming beam Li is caused to be "obliquely incident" in this manner, for greater angles θ with respect to the virtual vertical surface α, the light amount distribution γ exhibits a tendency to become closer to the gradient straight line Q. However, for greater angles θ with respect to the virtual vertical surface α, the light amount on the scanning surface 21a drops as a whole. The slope (gradient) of the gradient straight line Q mainly depends on material of the reflective member arranged at the reflective surface (reflective mirror) of the rotating multifaceted mirror 320.

These facts are also the same for a case where the rotating multifaceted mirror 320 rotates from the incoming side IN of the incoming beam Li to the reverse incoming side OUT (here, the counterclockwise direction).

FIRST EMBODIMENT

Accordingly, in a first embodiment, the light amount of the laser beam L outputted by laser diode 311 is controlled in a following manner.

Figure 6:
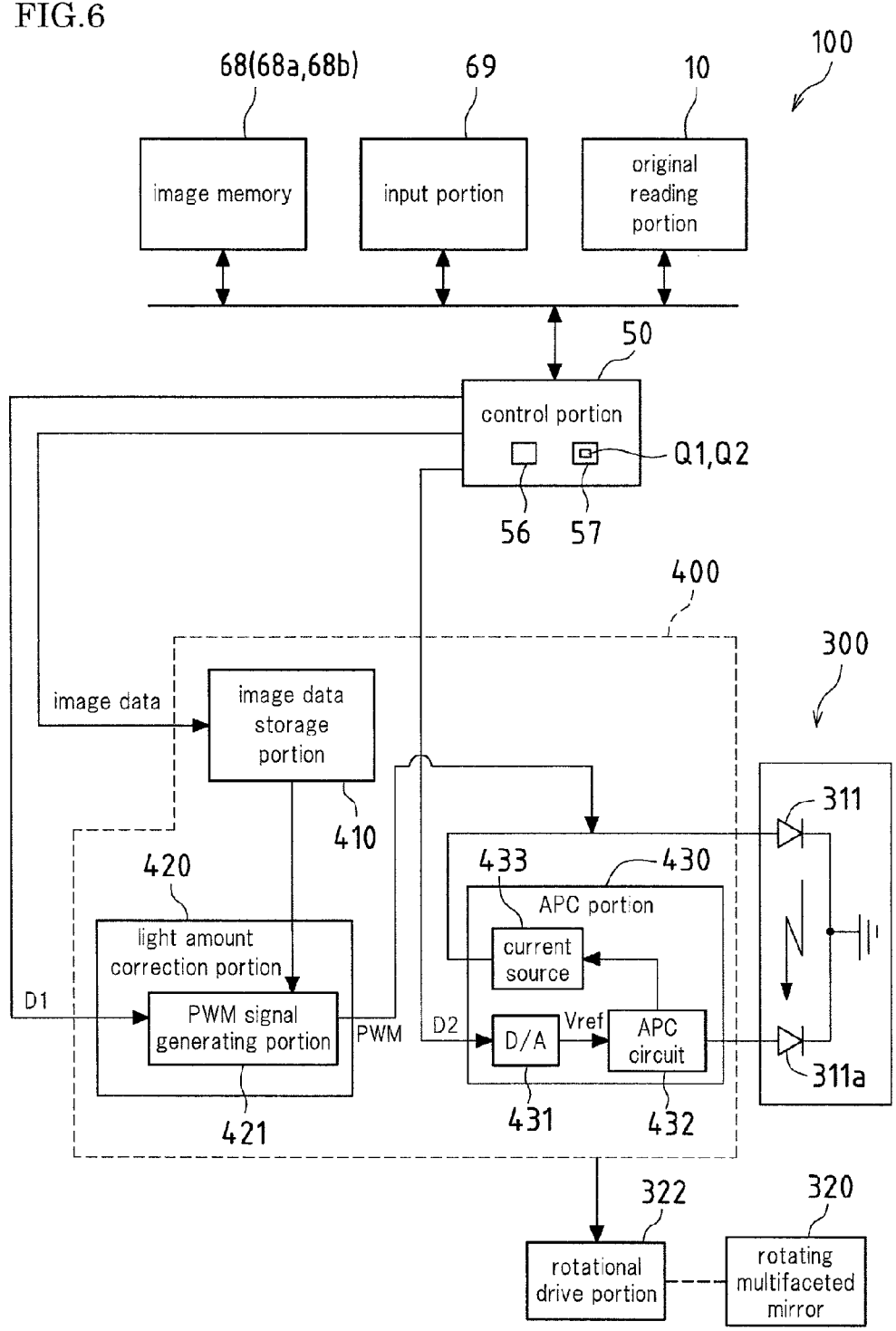
FIG. 6 is a system block diagram that centrally shows a control portion in the image forming apparatus shown in FIG. 1.

FIG. 6 is a system block diagram that centrally shows a control portion 50 in the image forming apparatus 100 shown in FIG. 1.

The control portion 50 is provided with a microcomputer 56 and a storage portion 57, for example. The storage portion 57 includes a ROM (read only memory), a RAM (random access memory), and a nonvolatile memory.

The ROM stores a control program, which is procedures for processing to be executed by the microcomputer 56. The RAM provides a work area for operations. The nonvolatile memory backs up and holds data required in control, and holds light amount data Q1 and Q2, which are described later.

It should be noted that the control portion 50 is provided with input circuits including an input buffer and an A/D conversion circuit, which are circuits for inputting input signals from members such as various sensors and switches and the like connected to its input system, and output circuits including drivers that drive motors, solenoids, and lamps and the like that are connected to its output system. The control portion 50 is configured to carry out timing control of output signals outputted from the output signals based on the input signals from the input circuits.

The control portion 50 is connected to an image memory 68 (68a and 68b), an input portion 69, an image reading portion 10, and the laser scanning device 300, which are provided in the image forming apparatus 100. The control portion 50 controls reading operations of images of originals by the image reading portion 10. The control portion 50 stores raster image data for each page of print data from the input portion 69 in the image memory 68a and/or stores original image data for each page in the image memory 68b from the image reading portion 10 that generates original image data by reading an image of an original. The control portion 50 controls writing operations performed by the laser scanning device 300 on the scanning surface 21a of the charged photosensitive drum 21.

The laser scanning device 300 is further provided with the writing control portion 400. The writing by the laser scanning device 300 on the photosensitive drum 21 is carried out according to the writing control portion 400, which receives instructional commands from the control portion 50.

The writing control portion 400 is connected by an the input system to the control portion 50, and is connected by an output system to the rotational drive portion 322 that rotationally drives the rotating multifaceted mirror 320. Furthermore, it is connected by an input/output system to the laser diode 311.

And, as an example of correcting the light amount distribution γ (see FIG. 5) for positions on the scanning surface 21a in the scanning direction X, based on image data and instruction signals from the control portion 50, the writing control portion 400 is configured to control light emission amounts of the laser diode 311 based on the slope of the gradient straight line Q that expresses a ratio of change of the light amounts for positions on the scanning surface 21a in the scanning direction X when scanning the scanning surface 21a using the outgoing beam Lo.

Specifically, the writing control portion 400 changes the light emission amounts of the laser diode 311 in response to the slant of the gradient straight line Q and with a slope inverse to the slope of the gradient straight line Q.

More specifically, the writing control portion 400 is capable of controlling the light emission amounts of the laser diode 311 using pulse width modulation (PWM) and power modulation.

A photodiode 311a is arranged near the laser diode 311. The light emission amount of the laser diode 311 is controlled by a drive current.

The writing control portion 400 is provided with an image data storage portion 410, a light amount correction portion 420, and a light amount correction control (APC: auto power control) portion 430 as a light source drive portion.

The image data storage portion 410 is configured to temporarily store image data that is sent in from the control portion 50. The light amount correction portion 420 is provided with a PWM signal generating portion 421. The light amount correction portion 420 is configured to use the PWM signal generating portion 421 to output PWM pulse signals for the image data that is temporarily stored in the image data storage portion 410 according to instruction signals sent in from the control portion 50. The PWM pulse signals are sent to the laser diode 311 to drive the laser diode 311. The APC portion 430 is configured to drive the laser diode 311 based on an input reference signal. More specifically, the APC portion 430 is configured to control the drive current (output current value of a current source 433) to the laser diode 311 so that a detection value of the light emission amount matches the input reference signal (here, a voltage Vref) when the laser diode 311 is pulse driven. Consequently, the drive current (output current value of the current source 433) for the laser diode 311 changes in response to changes in the input reference voltage Vref. To eliminate light amount fluctuations caused by laser temperature fluctuations and deterioration, the APC portion 430 periodically controls the drive current to the laser diode 311.

Control of drive current to the laser diode 311 is carried out in each non-image region such as between pages or between lines. Control of the laser drive state is instructed by the control portion 50.

The light amount correction portion 420 generates PWM pulse signals (hereinafter referred to as control pulse signals) PWM based on instruction signals from the control portion 50 using the PWM signal generating portion 421, and thus controls the light emission pulse width for carrying out laser driving. In this way, the drive current to the laser diode 311, and thus the light emission amount of the laser diode 311, can be controlled.

With the writing control portion 400 provided with this configuration, duty (PWM) control of the light emission amount of the laser diode 311 can be carried out based on the slope of the gradient straight line Q by keeping the input reference voltage Vref constant and changing the duty ratio of the control pulse signals PWM according to pulse width modulation.

Figure 7:
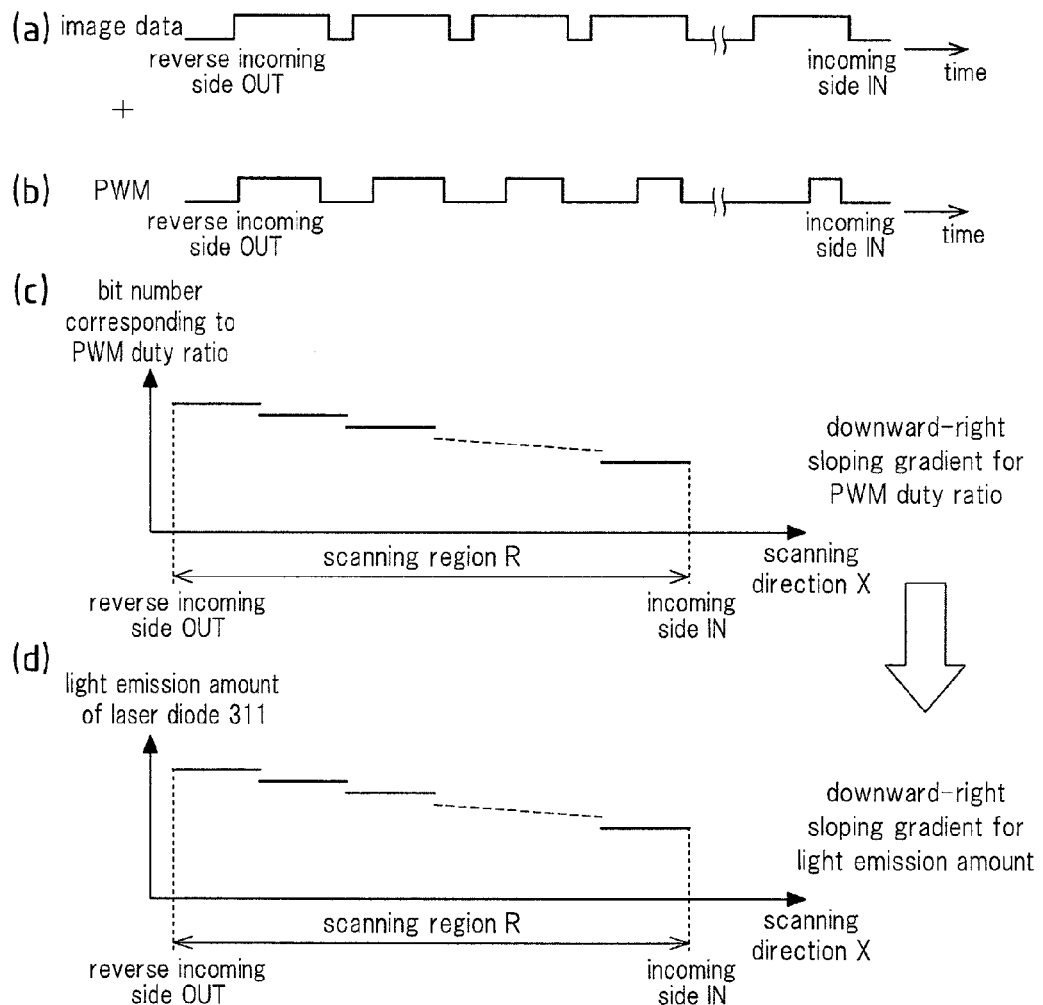
FIG. 7 is a descriptive diagram for describing duty (PWM) control of light emission amounts of a laser diode. Panel (a) of FIG. 7 is a timing chart showing temporal change in the cycle of image data. Panel (b) of FIG. 7 is a timing chart showing temporal change in the state of the control pulse signals corresponding to the slope of the gradient straight line. Panel (c) of FIG. 7 is a graph showing bit data corresponding to the duty ratio of the control pulse signals that have been set based on the slope of the gradient straight line. Panel (d) of FIG. 7 is a graph showing the light emission amounts of the laser diode that has undergone PWM modulation control according to the control pulse signals.

FIG. 7 is a descriptive diagram for describing duty (PWM) control of light emission amounts of the laser diode 311. Panel (a) of FIG. 7 is a timing chart showing temporal change in the cycle of image data. Panel (b) of FIG. 7 is a timing chart showing temporal change in the state of the control pulse signals PWM corresponding to the slope of the gradient straight line Q. Panel (c) of FIG. 7 is a graph showing bit data corresponding to the duty ratio of the control pulse signals PWM that have been set based on the slope of the gradient straight line Q. And panel (d) of FIG. 7 is a graph showing the light emission amounts of the laser diode 311 that has undergone PWM modulation control according to the control pulse signals PWM.

With the duty (PWM) control shown in FIG. 7, the light emission amount of the laser diode 311 is controlled by keeping the input reference voltage Vref constant and changing the duty ratio of the control pulse signal PWM using pulse width modulation based on the slope of the gradient straight line Q.

In the first embodiment, data of two points corresponding to the slope of the gradient straight line Q (see FIG. 5) is stored in advance in a nonvolatile memory in the storage portion 57, these being a first light emission amount Q1 (reverse incoming side OUT in FIG. 5) of the laser diode 311 corresponding to the light amount at a scanning position at one end in the scanning direction X of the scanning surface 21a, and a second light emission amount Q2 (incoming side IN in FIG. 5) of the laser diode 311 corresponding to the light amount at a scanning position at another end when scanning the scanning surface 21a using the outgoing beam Lo. The gradient straight line Q can be obtained by joining the two points Q1 and Q2 corresponding to light amounts at the one end and the other end in the scanning direction X of the scanning surface 21a on a plane (FIG. 5) that expresses the ratio of change of the light amounts for positions on the scanning surface 21a in the scanning direction X when scanning the scanning surface 21a using the outgoing beam Lo. The data of these two points can be set in advance through testing or the like. This is the same for the case of power control also, which is described later.

Here, the rotating multifaceted mirror 320 is rotationally driven from the reverse incoming side OUT of the incoming beam Li to the incoming side IN (rotation direction Z), and therefore bit data D1 corresponding to the duty ratio shown in panel (c) of FIG. 7 is set so as to become progressively smaller in response to the uniform gradient of the slope of the gradient straight line Q obtained using the first and second light emission amounts Q1 and Q2 stored in advance in the storage portion 57. With this bit data D1, the duty ratio of the control pulse signals PWM is set so as to become progressively smaller over time as shown in panel (b) of FIG. 7.

In this way, as scanning of the scanning surface 21a advances from the reverse incoming side OUT to the incoming side IN, the light emission amount of laser diode 311 can be reduced incrementally (in a staircase shape) as shown in panel (d) of FIG. 7 by progressively reducing the duty ratio of the control pulse signals PWM over time as shown in panel (b) of FIG. 7 for the image data shown in panel (a) of FIG. 7.

On the other hand, in the APC portion 430, to control the light emission amount of the laser diode 311, the light amount of the light flux diverged by the laser diode 311 is detected by the photodiode 311a, and a detection value thereof is inputted to the APC circuit 432. Furthermore, the digital input reference signal from the control portion 50 undergoes analog conversion by a digital-to-analog (D/A) converter 431, and the analog-converted input reference signal (here, the input reference voltage Vref) is inputted to the APC circuit 432.

When this happens, the APC portion 430 uses the APC circuit 432 to control the output current of the current source 433 so that the detection value detected by the photodiode 311a becomes equivalent to the input reference voltage Vref from the D/A converter 431. In this way, the drive current to the laser diode 311, and thus the light emission amount of the laser diode 311, can be controlled.

Figure 8:
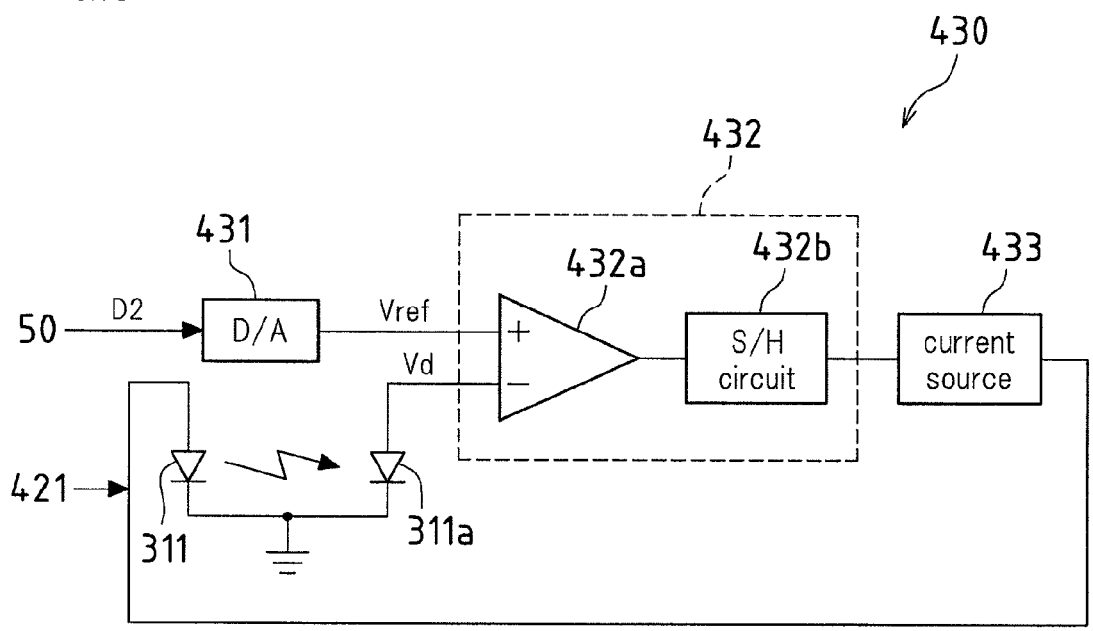
FIG. 8 is a schematic block diagram that schematically shows a circuit configuration of an APC circuit shown in FIG. 6.

FIG. 8 is a schematic block diagram that schematically shows a circuit configuration of the APC circuit 432 shown in FIG. 6.

As shown in FIG. 8, the APC circuit 432 is provided with a comparator 432a, and a sample and hold (S/H) circuit 432b for the current source 433.

The APC circuit 432 is configured so that the comparator 432a inputs and compares a voltage Vd of the photodiode 311a and the input reference voltage (input reference voltage from the D/A converter 431) Vref for setting the output current of the current source 433, and further still, under the instruction of a S/H control signal from the control portion 50, the S/H circuit 432b instructs the timing of sampling and holding to the current source 433.

With the writing control portion 400 provided with this configuration, power control of the light emission amount of the laser diode 311 can be carried out based on the slope of the gradient straight line Q by keeping the duty ratio of the control pulse signals PWM constant according to pulse width modulation, and changing the input reference voltage Vref.

FIG. 9 is a descriptive diagram for describing power control of light emission amounts of the laser diode 311. Panel (a) of FIG. 9 is a timing chart showing temporal change in the cycle of image data. Panel (b) of FIG. 9 is a timing chart showing temporal change in the state of the control pulse signals PWM for which the duty ratio is kept constant. Panel (c) of FIG. 9 is a timing chart showing temporal change in the input reference voltage Vref, which is set based on the slope of the gradient straight line Q. Panel (d) of FIG. 9 is a graph showing bit data corresponding to the value of the input reference voltage Vref, which has have been set based on the slope of the gradient straight line Q. And panel (e) of FIG. 9 is a graph showing the light emission amounts of the laser diode 311 that has undergone power modulation control according to the input reference voltage Vref.

With the power control shown in FIG. 9, the light emission amount of the laser diode 311 is controlled by keeping the control pulse signals PWM constant using pulse width modulation, and changing the input reference voltage Vref based on the slope of the gradient straight line Q.

Here, the rotating multifaceted mirror 320 is rotationally driven from the reverse incoming side OUT of the incoming beam Li to the incoming side IN (rotation direction Z), and therefore bit data D2 corresponding to the input reference voltage Vref shown in panel (d) of FIG. 9 is set so as to become progressively smaller in response to the uniform gradient of the slope of the gradient straight line Q obtained using the first and second light emission amounts Q1 and Q2 stored in advance in the storage portion 57. With this bit data D2, the value of the input reference voltage Vref is set so as to become progressively smaller over time as shown in panel (c) of FIG. 9.

In this way, as scanning of the scanning surface 21a advances from the reverse incoming side OUT to the incoming side IN, the light emission amount of laser diode 311 can be reduced progressively (continuously) as shown in panel (e) of FIG. 9 by progressively reducing the value of the input reference voltage Vref over time as shown in panel (c) of FIG. 9 for the image data shown in panel (a) of FIG. 9.

FIG. 10 is a descriptive diagram showing how the light amount at scanning positions in the scanning direction X on the scanning surface 21a can be uniformized by controlling the light amount of the laser diode 311 using the writing control portion 400. Panel (a) of FIG. 10 is a graph showing the light amount distribution γ and the gradient straight line Q of the scanning surface 21a in the scanning direction X when the light emission amount of the laser diode 311 is controlled to be constant. Panel (b) of FIG. 10 is a graph showing the distribution of the light emission amount of the laser diode 311 when control is performed based on the slope of the gradient straight line Q. Panel (c) of FIG. 10 is a graph showing the light amount distribution on the scanning surface 21a in the scanning direction X when the light emission amount of the laser diode 311 is controlled based on the slope of the gradient straight line Q.

As shown in FIG. 10, with the laser scanning device 300 according to the first embodiment, the light emission amount of the laser diode 311 is controlled (see panel (b) of FIG. 10) based on the slope of the gradient straight line Q (see panel (a) of FIG. 10) with respect to the light amount distribution γ (see panel (a) of FIG. 10) at positions on the scanning surface 21a in the scanning direction X when the scanning surface 21a is scanned by the outgoing beam Lo, and therefore the light amount at scanning positions on the scanning surface 21a in the scanning direction X can be uniformized (see panel (c) of FIG. 10). Moreover, since the light emission amount of the laser diode 311 may be controlled based on the slope of the gradient straight line Q without controlling the light emission amount of the laser diode aligned with slight changes in the light amount distribution as is conventionally the case, the control configuration can be simplified.

Further still, if only two points of data are set, these being the light emission amount Q1 of the laser diode 311 corresponding to the light amount at a scanning position at one end in the scanning direction X of the scanning surface 21a, and the light emission amount Q2 on the scanning surface 21a corresponding to the light amount at a scanning position at another end when scanning the scanning surface 21a using the outgoing beam Lo, then control of the light emission amount of the laser diode 311 can be easily achieved based on the slope of the gradient straight line Q. In this way, it is possible to simplify the control configuration, and thus also possible to simplify the design of the overfilled optical system 301.

Furthermore, in a case of carrying out the duty (PWM) control shown in FIG. 7, the light emission amount of the laser diode 311 can be reduced incrementally (in a staircase shape) as scanning of the scanning surface 21a advances from the reverse incoming side OUT to the incoming side IN, and therefore the light emission amount of the laser diode 311 can be appropriately controlled in response to the tendency of the light amount distribution to increase in the scanning direction X on the scanning surface 21a due to the rotation direction Z of the rotating multifaceted mirror 320. Moreover, the light emission amount of the laser diode 311 is changed in a incremental (staircase shape) manner, and therefore control of the light emission amount of the laser diode 311 based on the slope of the gradient straight line Q can be achieved with a simple control configuration. Further still, since merely the duty ratio is changed in existing PWM control configurations, a control configuration can be easily achieved in which the light emission amount of the laser diode 311 is changed incrementally.

Furthermore, in a case of carrying out the power control shown in FIG. 9, the light emission amount of the laser diode 311 can be reduced progressively (continuously) as scanning of the scanning surface 21a advances from the reverse incoming side OUT to the incoming side IN, and therefore the light emission amount of the laser diode 311 can be appropriately controlled in response to the tendency of the light amount distribution to increase in the scanning direction X on the scanning surface 21a due to the rotation direction Z of the rotating multifaceted mirror 320. Moreover, the light emission amount of the laser diode 311 is changed progressively, and therefore control of the light emission amount of the laser diode 311 based on the slope of the gradient straight line Q can be achieved with a simple control configuration. Further still, since merely the input reference voltage Vref is changed in existing power modulation control configurations, a control configuration can be easily achieved in which the light emission amount of the laser diode 311 is changed progressively.

Although it goes without saying, it should be noted that in a case where the rotating multifaceted mirror 320 is caused to rotate from the incoming side IN of the incoming beam Li to the reverse incoming side OUT (counterclockwise in the diagrams), the scanning direction X is reversed, and therefore the aforementioned increases and decreases in the light amount control are reversed.

Furthermore, the BD sensor 341 tends to give false detections when the light amount of the incoming synchronization detection beam Ld is smaller than a prescribed amount, and therefore by arranging it on the incoming side IN (here, the scan finish side) where the light amount is larger than the reverse incoming side OUT (here, the scan start side), stable detections can be performed. In this way, more accurate detections can be achieved, which is correspondingly more advantageous.

Furthermore, in the laser scanning device 300, it is possible to switch a light-increasing operation in which the light emission amount of the laser diode 311 is increased as scanning advances on the scanning surface 21a, and a light-decreasing operation in which the light emission amount of the laser diode 311 is decreased as scanning advances on the scanning surface 21a, and in a case where the rotating multifaceted mirror 320 is caused to rotate from the incoming side IN to the reverse incoming side OUT, a switch can be made to the light-increasing operation, while in a case where the rotating multifaceted mirror 320 is caused to rotate from the reverse incoming side OUT to the incoming side IN, a switch can be made to the light-decreasing operation.

SECOND EMBODIMENT

In a second embodiment, instead of the configuration of the first embodiment in which the slope of the gradient straight line Q is set in advance, a configuration is used in which the slope of the gradient straight line Q can be detected at any time.

Figure 11:
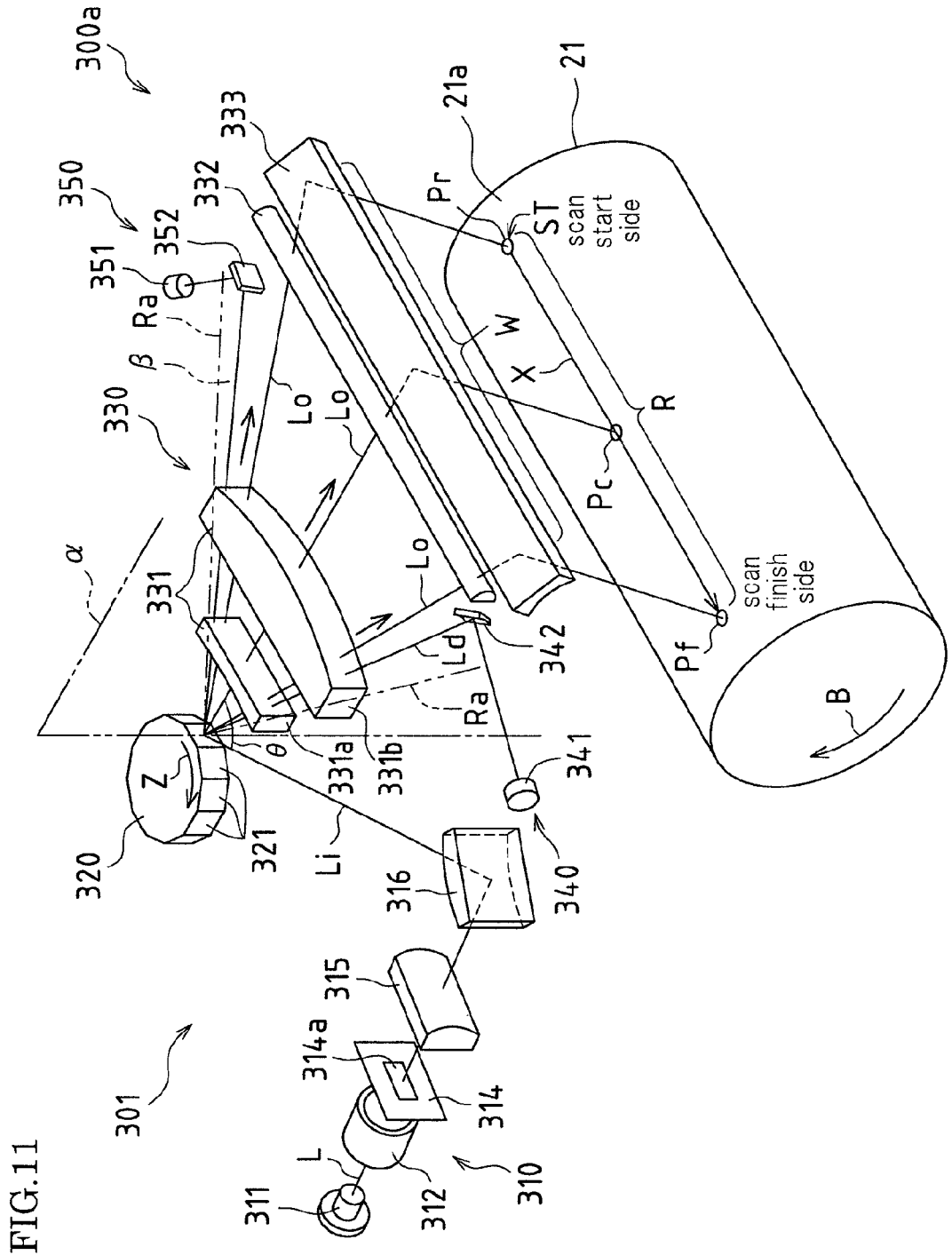
FIG. 11 is a perspective view schematically showing a configuration of a laser scanning device according to a second embodiment.

FIG. 11 is a perspective view schematically showing a configuration of a laser scanning device 300a according to the second embodiment.

The laser scanning device 300a shown in FIG. 11 is provided with a beam detecting portion 350 in addition to the beam detecting portion 340 in the laser scanning device 300 shown in FIG. 2. That is, the laser scanning device 300a is further provided with a beam detecting portion 350 that detects the outgoing beam Lo at the scan start side of the scanning surface 21a.

Same reference symbols are assigned to configurations in the laser scanning device 300a shown in FIG. 11 that are the same in the laser scanning device 300 in FIG. 2, and description thereof is omitted.

In the second embodiment, the first and second light emission amounts Q1 and Q2 are not stored in advance in the storage portion 57 as in the first embodiment, but detection results of the beam detecting portions 340 and 350 are used.

The beam detecting portion 340 acts as the scan finish side light amount detection portion, and the BD sensor 341 detects not only the presence/absence of the outgoing beam Lo (the synchronization detection beam Ld), but also detects the light amount of the outgoing beam Lo at the scan finish side. That is, the BD sensor 341 is used to serve jointly having a function of detecting the presence/absence of the outgoing beam Lo and a function of detecting the light amount of the outgoing beam Lo.

With the beam detecting portion 340 provided with this configuration, the synchronization detection beam Ld, which is the outgoing beam Lo that has passed through the f-theta lens 331 by being deflection scanned by the rotating multifaceted mirror 320 to move to the outer side of the scanning range W (here, the scan finish side), is folded by the synchronization folding mirror 342, and the presence/absence and the light amount of the synchronization detection beam Ld can be detected by the BD sensor 341.

The beam detecting portion 350 acts as the scan start side light amount detection portion and includes a light amount detecting sensor 351 that detects the light amount of the outgoing beam Lo at the scan start side, and a folding mirror 352 positioned at an outer side of the scanning range W (here, the scan start side) that guides the outgoing beam to the light amount detecting sensor 351. The folding mirror 352 has a concave reflective surface.

With the beam detecting portion 350 provided with this configuration, the synchronization detection beam Ld, which is the outgoing beam Lo that has passed through the f-theta lens 331 by being deflection scanned by the rotating multifaceted mirror 320 to move to the outer side of the scanning range W (here, the scan start side), is folded by the folding mirror 352 and the light amount of the synchronization detection beam Ld can be detected by the light amount detecting sensor 351.

Then, the detected light amount that is detected by the beam detecting portion 350 acting as the scan start side light amount detection portion is processed as the first light emission amount Q1, and detected light amount that is detected by the beam detecting portion 340 acting as the scan finish side light amount detection portion is processed as the second light emission amount Q2.

With the laser scanning device 300a according to the second embodiment, the slope of the gradient straight line Q can be obtained based on the light amount of the outgoing beam Lo at the scan start side of the scanning surface 21a detected by the beam detecting portion 350 and the light amount of the outgoing beam Lo at the scan finish side of the scanning surface 21a detected by the beam detecting portion 340. In this way, the slope of the gradient straight line Q can be detected at any time. This detection may be carried out for each line of scanning for example, or may be carried out periodically for prescribed numbers of lines or prescribed interval.

THIRD EMBODIMENT

As a different example of correcting the light amount distribution γ (see FIG. 5) for the scanning direction X positions on the scanning surface 21a, instead of the configuration in the first embodiment in which the light emission amount of the laser diode 311 is controlled, in a third embodiment, a first light amount correction filter 360 is arranged.

Figure 12:
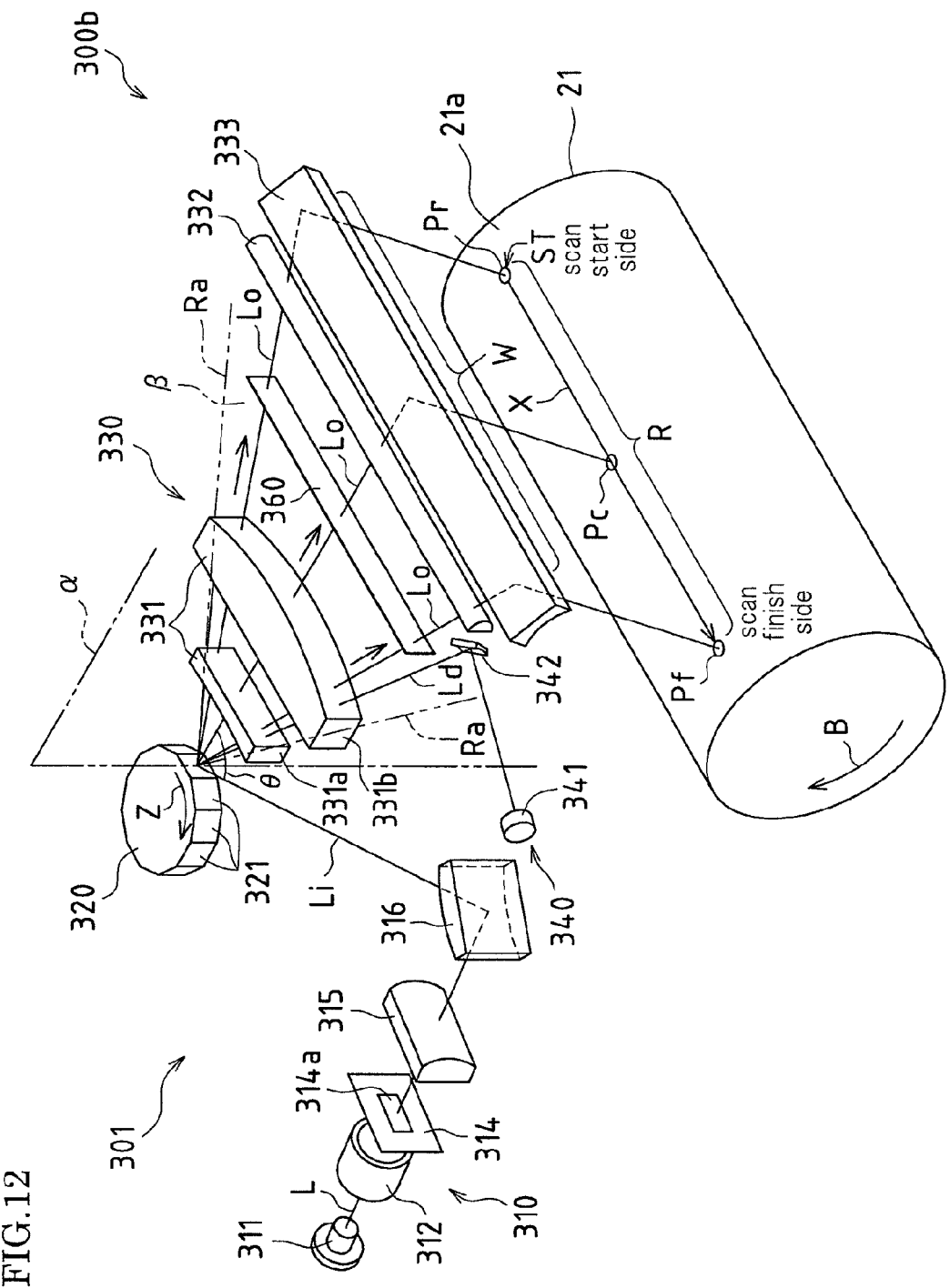
FIG. 12 is a perspective view schematically showing a configuration of a laser scanning device according to a third embodiment.

FIG. 12 is a perspective view schematically showing a configuration of a laser scanning device 300b according to the third embodiment.

In the laser scanning device 300b shown in FIG. 12, a first light amount correction filter 360 is arranged on an optical path between the rotating multifaceted mirror 320 and the photosensitive drum 21 (here, between the f-theta lens 331 and the second cylindrical lens 332) instead of performing control of the light emission amount of the laser diode 311 in the laser scanning device 300 shown in FIG. 2.

In the third embodiment, the first light amount correction filter 360 is a component that reduces the light amount of the light that passes through, and therefore it is preferably arranged so as to not block the synchronization detection beam Ld to the BD sensor 341.

Here, the first light amount correction filter 360 is arranged between the f-theta lens 331 and the second cylindrical lens 332, so for a position that would ensure it does not block the synchronization detection beam Ld to the BD sensor 341, it may be arranged in any position between the rotating multifaceted mirror 320 and the photosensitive drum 21. For example, although the length of the first light amount correction filter 360 can be shortened for closer distances to the rotating multifaceted mirror 320 as in a case where the first light amount correction filter 360 is arranged between the rotating multifaceted mirror 320 and the f-theta lens 331, the distance between the scanning region W and the maximum scanning region Ra becomes smaller so that the first light amount correction filter 360 becomes more likely to interfere with the synchronization detection beam Ld, and therefore precision in the arrangement position of the first light amount correction filter 360 is required. Furthermore, in a case where the first light amount correction filter 360 is arranged between the outgoing folding mirror 333 and the photosensitive drum 21, although it is necessary to increase the length of the first light amount correction filter 360, interfering with the synchronization detection beam Ld is not a concern.

It should be noted that the first light amount correction filter 360 may be arranged on the optical path between the rotating multifaceted mirror 320 and the photosensitive drum 21 in addition to the configuration of performing control of the light emission amount of the laser diode 311 in the laser scanning device 300 shown in FIG. 2.

FOURTH EMBODIMENT

As a further different example of correcting the light amount distribution γ (see FIG. 5) for the scanning direction X positions on the scanning surface 21a, instead of the configuration in the first embodiment in which the light emission amount of the laser diode 311 is controlled, in a fourth embodiment, a second light amount correction filter 370 is arranged.

Figure 13:
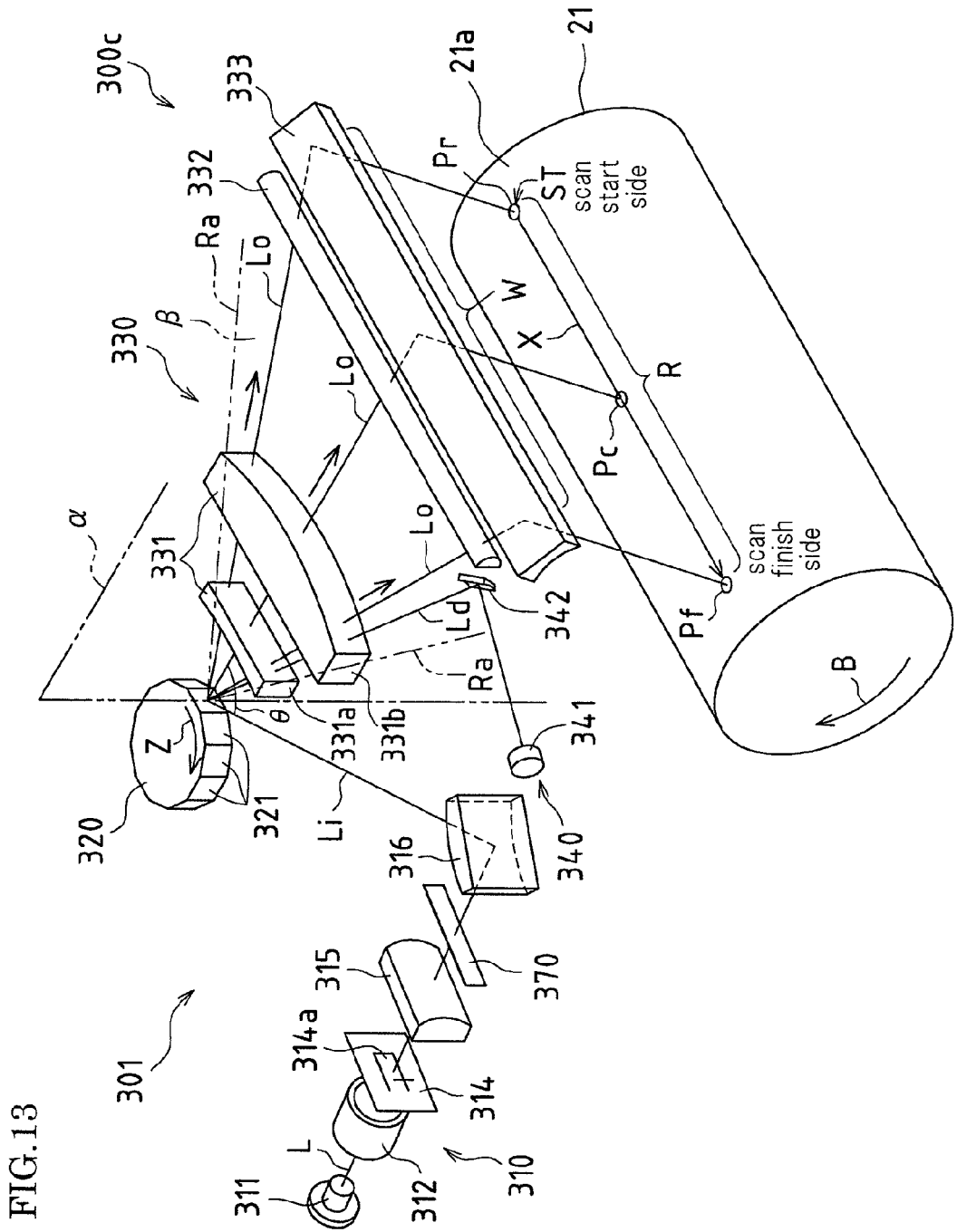
FIG. 13 is a perspective view schematically showing a configuration of a laser scanning device according to a fourth embodiment.

FIG. 13 is a perspective view schematically showing a configuration of a laser scanning device 300c according to the fourth embodiment.

In the laser scanning device 300c shown in FIG. 13, the second light amount correction filter 370 is arranged on the optical path between the laser diode 311 and the rotating multifaceted mirror 320 (here, between the first cylindrical lens 315 and the incoming folding mirror 316) instead of performing control of the light emission amount of the laser diode 311 in the laser scanning device 300 shown in FIG. 2.

In the fourth embodiment, the second light amount correction filter 370 is a component that reduces the light amount of the light that passes through, and therefore it is preferably arranged so as to not block the synchronization detection beam Ld to the BD sensor 342.

Here, the second light amount correction filter 370 is arranged between the first cylindrical lens 315 and the incoming folding mirror 316, so for a position that would ensure it does not block the synchronization detection beam Ld to the BD sensor 341, it may be arranged in any position between the laser diode 311 and the rotating multifaceted mirror 320.

It should be noted that the second light amount correction filter 370 may be arranged on the optical path between the laser diode 311 and the rotating multifaceted mirror 320 in addition to the configuration of performing control of the light emission amount of the laser diode 311 in the laser scanning device 300 shown in FIG. 2.

REGARDING THE THIRD AND FOURTH EMBODIMENTS

Next, description is given regarding the third and fourth embodiments, and same reference symbols are assigned to configurations in the laser scanning device 300b and 300c shown in FIG. 12 and FIG. 13 that are the same in the laser scanning device 300 in FIG. 2, and description thereof is omitted.

The first and second light amount correction filters 360 and 370 are formed to have an optical transmissivity distribution based on the slope of the gradient straight line Q.

Specifically, with the first and second light amount correction filters 360 and 370, the optical transmissivity changes in response to the slope of the gradient straight line Q for scanning positions in the scanning direction X and with a reverse slope to the slope of the gradient straight line Q.

Figure 14:
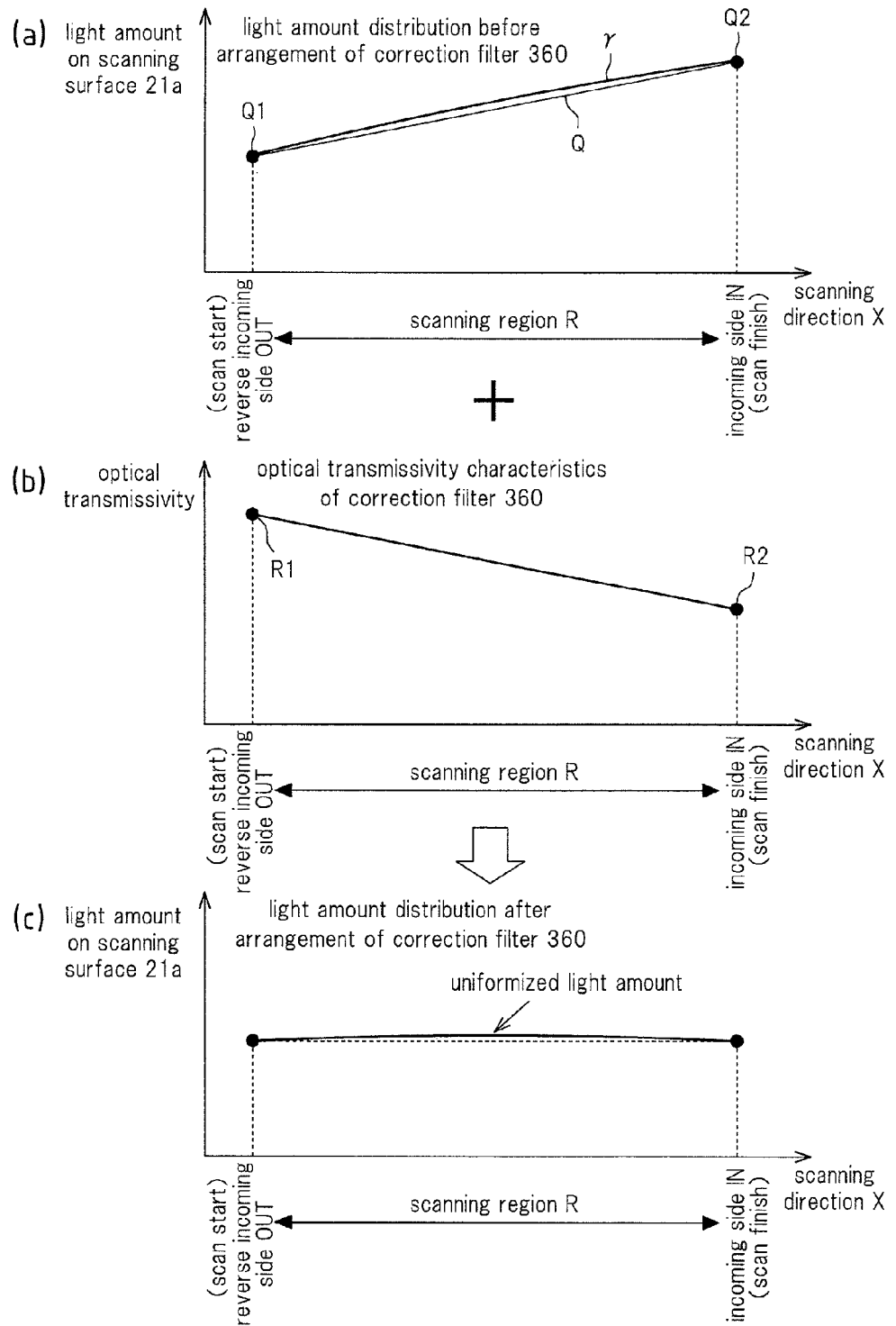
FIG. 14 is a descriptive diagram showing how the light amount at scanning positions in the scanning direction on the scanning surface can be uniformized by arranging a first light amount correction filter on an optical path between the rotating multifaceted mirror and the photosensitive drum. Panel (a) of FIG. 14 is a graph showing the light amount distribution in the scanning direction on the scanning surface when scanning the scanning surface using the outgoing beam in a state in which the first light amount correction filter is not arranged. Panel (b) of FIG. 14 is a graph showing optical transmissivity characteristics of the first light amount correction filter. Panel (c) of FIG. 14 is a graph showing the light amount distribution in the scanning direction on the scanning surface when the first light amount correction filter is arranged.

FIG. 14 is a descriptive diagram showing how the light amount at scanning positions in the scanning direction X on the scanning surface 21a can be uniformized by arranging the first light amount correction filter 360 on the optical path between the rotating multifaceted mirror 320 and the photosensitive drum 21. Panel (a) of FIG. 14 is a graph showing the light amount distribution in the scanning direction X on the scanning surface 21a when scanning the scanning surface 21a using the outgoing beam Lo in a state in which the first light amount correction filter 360 is not arranged. Panel (b) of FIG. 14 is a graph showing optical transmissivity characteristics of the first light amount correction filter 360. Panel (c) of FIG. 14 is a graph showing the light amount distribution in the scanning direction X on the scanning surface 21a when the first light amount correction filter 360 is arranged.

FIG. 15 is a descriptive diagram showing how the light amount at scanning positions in the scanning direction X on the scanning surface 21a can be uniformized by arranging the second light amount correction filter 370 on the optical path between the laser diode 311 and the rotating multifaceted mirror 320. Panel (a) of FIG. 15 is a graph showing the light amount (light intensity) distribution for width direction H distances of the incoming beam Li in a state in which the first light amount correction filter 360 is not arranged. Panel (b) of FIG. 15 is a graph showing optical transmissivity characteristics of the second light amount correction filter 370. Panel (c) of FIG. 15 is a graph showing the light amount (light intensity) distribution for width direction H distances of the incoming beam Li after it has passed through the second light amount correction filter 370 when the second light amount correction filter 370 is arranged. It should be noted that in panel (c) of FIG. 15, the dashed line shows the light amount distribution β0 of the incoming beam Li in a case where it does not travel via the second light amount correction filter 370. Panel (d) of FIG. 15 is a graph showing the light amount distribution in the scanning direction X on the scanning surface 21a when the second light amount correction filter 370 is arranged.

The first and second light amount correction filters 360 and 370 are formed by setting two points of data corresponding to the slope of the gradient straight line Q obtained using the first light emission amount Q1 and the second light emission amount Q2, the two points of data being a first optical transmissivity R1 (see the reversing incoming side OUT in panel (b) of FIG. 14 and panel (b) of FIG. 15) corresponding to a scanning position at one end in the scanning direction X of the first and second light amount correction filters 360 and 370, and a second optical transmissivity R2 (see the incoming side IN in panel (b) of FIG. 14 and panel (b) of FIG. 15) corresponding to a scanning position at another end in the scanning direction X of the first and second light amount correction filters 360 and 370. It should be noted that the first and second light emission amounts Q1 and Q2 can be set in advance through testing or the like.

Here, further description is given regarding the light amount distribution (see panel (d) of FIG. 15) in the scanning direction X on the scanning surface 21a when the second light amount correction filter 370 is arranged in the laser scanning device 300c according to the fourth embodiment.

Figure 16:
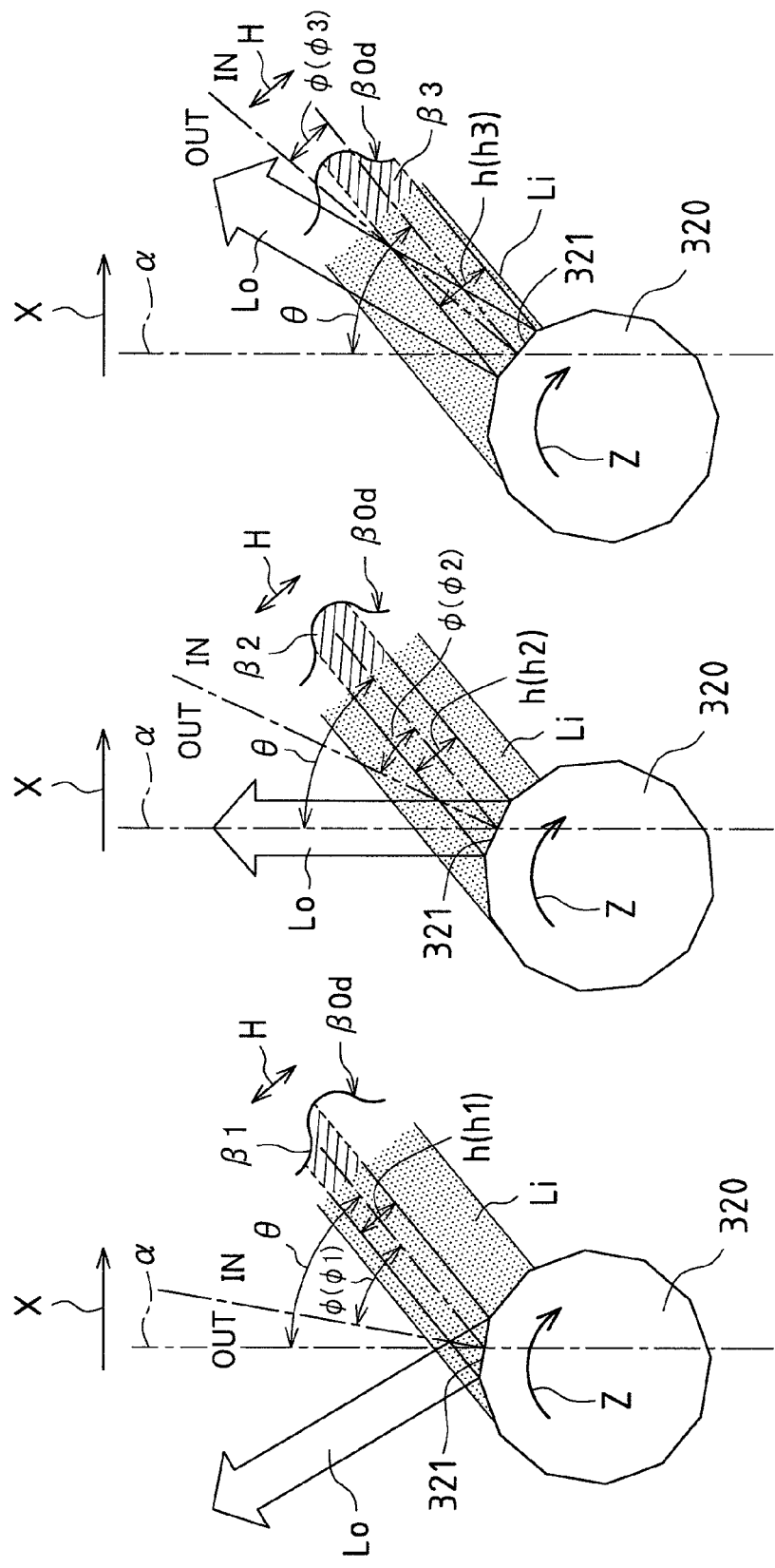
FIG. 16 (a) to FIG. 16(c) are descriptive diagrams for describing the light amount distribution in scanning regions of the scanning surface in the scanning direction in the laser scanning device shown in FIG. 13.

FIGS. 16(a) to 16(c) are descriptive diagrams for describing the light amount distributions in the scanning region R in the scanning direction X on the scanning surface 21a in the laser scanning device 300c shown in FIG. 13, and show a light amount distribution β0d with respect to the width direction H distance of the incoming beam Li after passing through the second light amount correction filter 370 shown in panel (c) of FIG. 15 for both the incoming state of the incoming beam Li and the outgoing state of the outgoing beam Lo with respect to the rotating multifaceted mirror 320. FIG. 16(a) shows a state in which the outgoing beam Lo is outgoing from the reflective surface 321 of the rotating multifaceted mirror 320 to an upstream side of the scanning direction X with reference to the virtual vertical surface α. FIG. 16(b) shows a state in which the outgoing beam Lo is outgoing from the reflective surface 321 of the rotating multifaceted mirror 320 and parallel to the virtual vertical surface α. FIG. 16(c) shows a state in which the outgoing beam Lo is outgoing from the reflective surface 321 of the rotating multifaceted mirror 320 to a downstream side of the scanning direction X with reference to the virtual vertical surface α.

In the laser scanning device 300c according to the fourth embodiment, the incoming beam Li is caused to be incident on the reflective surface 321 of the rotating multifaceted mirror 320 in a state having an angle θ with respect to the virtual vertical surface α, and therefore when the outgoing beam Lo is outgoing from the reflective surface 321 of the rotating multifaceted mirror 320 to the upstream side (left side in the diagram) of the scanning direction X with reference to the virtual vertical surface α as shown in FIG. 16(a), in the region β1 corresponding to the outgoing beam Lo of the incoming beam Li, the optical transmissivity of the second light amount correction filter 370 in the scanning direction X decreases along with movement from the reverse incoming side OUT to the incoming side IN as shown in panel (b) of FIG. 15, and accordingly, compared to the light amount distribution β0 (see dashed line) where it does not travel through the second light amount correction filter 370, the light amount of the incoming beam Li decreases as it moves to the incoming side IN as shown in panel (c) of FIG. 15.

Furthermore, when the outgoing beam Lo is outgoing from the reflective surface 321 of the rotating multifaceted mirror 320 parallel to the virtual vertical surface α as shown in FIG. 16(b), the light amount of the incoming beam Li decreases as it moves to the incoming side IN as shown in FIG. panel (c) of 15 in the region β2 corresponding to the outgoing beam Lo of the incoming beam Li.

Furthermore, when the outgoing beam Lo is outgoing from the reflective surface 321 of the rotating multifaceted mirror 320 to the other side (right side in the diagram) in the scanning direction X with reference to the virtual vertical surface α as shown in FIG. 16(c), the light amount of the incoming beam Li decreases as it moves to the incoming side IN as shown in panel (c) of FIG. 15 in the region β3 corresponding to the outgoing beam Lo of the incoming beam Li.

In this way, in the scanning region R of the outgoing beam Lo on the scanning surface 21a, in the state shown in FIG. 16(a), the light amount (light intensity) transitions in a substantially constant manner even as the outgoing beam Lo moves toward the incoming side IN as shown by the reference symbol γ1 in panel (d) of FIG. 15. Furthermore, in the state shown in FIG. 16(b), the light amount (light intensity) transitions in a substantially constant manner even as the outgoing beam Lo moves toward the incoming side IN as shown by the reference symbol γ2 in panel (d) of FIG. 15. Furthermore, in the state shown in FIG. 16(c), the light amount (light intensity) transitions in a substantially constant manner even as the outgoing beam Lo moves toward the incoming side IN as shown by the reference symbol γ3 in panel (d) of FIG. 15.

In this way, with the second light amount correction filter 370, the incoming beam Li that is incident on the rotating multifaceted mirror 320 can be shielded so that the light amount distribution γ (see panel (a) of FIG. 14) at scanning positions in the scanning direction X on the scanning surface 21a become uniform (see panel (d) of FIG. 15).

With the laser scanning devices 300b and 300c according to the third and fourth embodiments, as shown in FIG. 14 and FIG. 15, the first and second light amount correction filters 360 and 370 are formed to achieve an optical transmissivity distribution (see panel (b) of FIG. 14 and panel (b) of FIG. 15) based on the slope of the gradient straight line Q, and therefore with the first and second light amount correction filters 360 and 370, the outgoing beam Lo irradiated onto the scanning surface 21a can be shielded so that the light amount distribution γ (see panel (a) of FIG. 14) at scanning positions in the scanning direction X on the scanning surface 21a become uniform (see panel (c) of FIG. 14 and panel (d) of FIG. 15). Moreover, since it is sufficient to form the first and second light amount correction filters 360 and 370 so as to have an optical transmissivity distribution based on the gradient straight line Q without having to design and manufacture the filter so as to have a curved shaped optical transmissivity distribution aligned with slight changes in the light amount distribution as is conventionally the case, there is increased leeway in the filter design and manufacturing of the filter can be simplified.

Further still, by merely setting two points of data, these being the first optical transmissivity R1 (see the reversing incoming side OUT in panel (b) of FIG. 14 and panel (b) of FIG. 15) corresponding to a scanning position at one end in the scanning direction X of the first and second light amount correction filters 360 and 370, and a second optical transmissivity R2 (see the incoming side IN in panel (c) of FIG. 14 and panel (c) of FIG. 15) corresponding to a scanning position at another end in the scanning direction X of the first and second light amount correction filters 360 and 370, then forming an optical transmissivity distribution can be achieved easily based on the slope of the gradient straight line Q in the first and second light amount correction filters 360 and 370. In this way, it is possible to simplify the design and manufacture of the first and second light amount correction filters 360 and 370, and thus also possible to simplify the design and manufacture of the overfilled optical system 301.

Furthermore, the first and second light amount correction filters 360 and 370 are formed so that the optical transmissivity of the optical transmissivity distribution increases from the incoming side IN of the incoming beam Li to the reverse incoming side OUT, and therefore the light irradiated onto the scanning surface 21a can be appropriately shielded in response to the light amount distribution in the scanning direction X on the scanning surface 21a.

Furthermore, in the third and fourth embodiments, the optical transmissivity distribution of the first and second light amount correction filters 360 and 370 increases progressively, but it may increase incrementally. By progressively or incrementally increasing the optical transmissivity distribution of the first and second light amount correction filters 360 and 370 in this manner, the optical transmissivity distribution based on the slope of the gradient straight line Q in the first and second light amount correction filters 360 and 370 can be achieved simply and easily.

A component in which a light-shielding material is formed as a film on an optically transmissive member using a deposition method can be set forth as an example of the first and second light amount correction filters 360 and 370.

In this case, since the first and second light amount correction filters 360 and 370 are formed using a deposition method to achieve a filter optical transmissivity distribution based on the slope of the gradient straight line Q, the time and effort required in manufacturing the first and second light amount correction filters 360 and 370 can be greatly reduced.

For example, in a case where the light amount correction filter applicable in the optical scanning device according to the present invention is a component in which a light-shielding material is formed as a film on an optically transmissive member such as a glass plate using a deposition method, when forming the light amount correction filter so that the optical transmissivity of the optical transmissivity distribution increases progressively from the incoming side to the reverse incoming side, a mask portion that masks the optically transmissive member from the light-shielding material can be caused to move continuously at a constant velocity from the incoming side to the reverse incoming side to form the film during coating deposition onto the optically transmissive member. In this case, the velocity at which the mask portion is caused to move can be set as required in response to the slope of the gradient straight line Q or the quality of material or the like of the light-shielding member.

Furthermore, in the case of forming the light amount correction filter so that the optical transmissivity of the optical transmissivity distribution increases incrementally from the incoming side to the reverse incoming side, the mask portion masking the optically transmissive member from the light-shielding material can be caused to move intermittently (that is, while repeating a pause of a fixed time and a movement of a fixed distance) from the incoming side to the reverse incoming side to form the film during coating deposition onto the optically transmissive member. In this case, the time of the pausing and the distance the mask portion is caused to move can be set as required in response to the slope of the gradient straight line Q or material or the like of the light-shielding member.

Various methods can be set forth as the deposition method, including for example an electron beam method, a resistance heating method, a sputtering method, and an ion beam sputtering method. However, there is no limitation to these.

Examples of the light-shielding material that can be set forth include titanium oxide ($TiO_2$), tantalum oxide ($Ta_2O_5$), zinc oxide, (ZnO), zirconium oxide ($ZrO_2$), zinc sulfide (ZnS), magnesium fluoride ($MgF_2$), and aluminum oxide ($Al_2O_3$). However, there is no limitation to these.

The present invention can be embodied and practiced in other different forms without departing from the spirit and essential characteristics thereof. Therefore, the above-described working examples are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An optical scanning device comprising an overfilled optical system in which an incoming beam of a light beam incident on a reflective surface of a rotating multifaceted mirror from a light source is incident such that the width of the incident light beam is wider on the reflective surface than a width in a rotation direction of the reflective surface of the rotating multifaceted mirror, and is reflected on the reflective surface; and a scanning surface of a scanning object is scanned by an outgoing beam reflected by the reflective surface, wherein the incoming beam is caused to be incident on the reflective surface of the rotating multifaceted mirror in a state having an angle with respect to a virtual vertical surface that is vertical to the scanning surface and vertical to a scanning direction of the outgoing beam so that a light amount distribution is approximated by a straight line having a one-sided gradient, the light amount distribution for positions on the scanning surface in the scanning direction when scanning the scanning surface using the outgoing beam, wherein the light amount distribution for positions on the scanning surface in the scanning direction is corrected based on a slope of the straight line;

wherein a light emission amount of the light source is controlled to perform the correction based on the slope of the straight line, and wherein a first light amount detection portion that detects a light amount of the outgoing beam at a scan start side of the scanning surface, and a second light amount detection portion that detects the light amount of the outgoing beam at a scan finish side of the scanning surface are provided so that the slope of the straight line can be obtained based on the light amount detected by the first light amount detection portion and the second light amount detection portion.

2. The optical scanning device according to claim 1, wherein the rotating multifaceted mirror is caused to rotate from an incoming side of the incoming beam to an outgoing side of the outgoing beam of an opposite side to the incoming side, and the light emission amount of the light source is increased as scanning of the scanning surface advances.

3. The optical scanning device according to claim 1, wherein the rotating multifaceted mirror is caused to rotate from an outgoing side of the outgoing beam to an incoming side of the incoming beam of an opposite side to the outgoing side, and the light emission amount of the light source is decreased as scanning of the scanning surface advances.

4. The optical scanning device according to claim 1, wherein the light emission amount of the light source is changed progressively or incrementally.

5. The optical scanning device according to claim 1, wherein control of the light emission amount of the light source based on the slope of the straight line is carried out by changing a duty ratio of a pulse signal that drives the light source, according to pulse width modulation.

6. The optical scanning device according to claim 1, comprising:

a light source drive portion that drives the light source based on an input reference signal, wherein control of the light emission amount of the light source based on the slope of the straight line is carried out by changing the input reference signal according to power modulation.

7. The optical scanning device according to claim 1, wherein the straight line is a straight line in which two points are joined corresponding to light amounts at one end and another end in the scanning direction on the scanning surface on a plane that expresses a ratio of change of the light amounts for positions on the scanning surface in the scanning direction when scanning the scanning surface using the outgoing beam.

8. An image forming apparatus comprising an optical scanning device according to claim 1.

9. The image forming apparatus according to claim 8, further comprising a photosensitive body to be scanned by an outgoing beam from the optical scanning device.

* * * * *